United States Patent [19]
Hartnett

[11] Patent Number: 6,112,188
[45] Date of Patent: Aug. 29, 2000

[54] PRIVATIZATION MARKETPLACE

[76] Inventor: William J. Hartnett, 3831 E. Blanche St., Pasadena, Calif. 91107

[21] Appl. No.: 08/436,219

[22] PCT Filed: Nov. 1, 1993

[86] PCT No.: PCT/US93/10557

§ 371 Date: Nov. 20, 1995

§ 102(e) Date: Nov. 20, 1995

[87] PCT Pub. No.: WO94/10637

PCT Pub. Date: May 11, 1994

[30] Foreign Application Priority Data

Oct. 30, 1992 [GB] United Kingdom .................. 9222884

[51] Int. Cl.[7] .................................................. G06F 17/60
[52] U.S. Cl. ............................................. 705/35; 705/36
[58] Field of Search .................................... 395/235, 236, 395/237, 239; 705/35, 36, 37

[56] References Cited

U.S. PATENT DOCUMENTS 5,987,435  11/1999  Weiss et al. ............................... 705/36

OTHER PUBLICATIONS

Romania struggles to open exchange, Emerging Securities MarketsnReview, pp. 16–17, Oct. 1994.

Lorinc, Marek, Investing in financial markets of East and Central Europe, The Columbia Journal of World Business, pp. 88–111, Spr, 1995.

Voucher power, The Economist, pp. 18–20, Sep. 21, 1991.

Milan Ruzicka, Risks Cited as Czechs Begin Massive Stock Trading, Journal of Commerce, p. 2A, May 24, 1993.

Dr. W. P.Vossen, Investment Climate in Eastern Europe, Plant Sites and Parks, p. 32, Aug. 1992.

*Primary Examiner*—Edward Cosimano

[57] ABSTRACT

Computerized methods and tools for developing and implementing economic policies are provided. The methods and tools, which do not rely on advanced communications of financial market trading infrastructure, include the principal steps of preparing a privatization business plan (101) that includes an cost of the assets and a plan for distributing the assets. The review of the privatization plan by a Privatization Board (103). Executing the plan (105). Restructuring the enterprise in accordance to the plan (107). Submitting an application for certification of demonopolization to the Privatization Board (109). Receiving an effective demonopolization date from the Privatization Board (111).

20 Claims, 7 Drawing Sheets

PRIVATIZATION MARKETPLACE

FIELD OF THE INVENTION

The present invention is generally related to the fields of information technology and market economics. The invention is more particularly related to computerized tools and methods useful for achieving a successful market economy. Yet more particularly, the present invention is related to tools and methods useful for privatizing, or transferring from state ownership to individual ownership, large state enterprises in newly democratic nations.

BACKGROUND OF THE INVENTION

Among the many tasks necessary to create a successful new world order, after the events of the past several years in Eastern Europe and the former Soviet Union, it will be necessary to transfer ownership rights in substantial portions of some countries' vast state-owned capital stock into private hands. In such countries, as well as others currently lacking effective owner shares markets, it may be desirable to develop policies and tools for operating such owner shares markets. Methods, tools and tasks necessary to accomplish such an enormous economic undertaking, without causing socially destructive economic dislocation is the subject of intense current research.

It is a general goal of the present invention to provide computerized market tools usable in countries which may be lacking market infrastructure. It is a more specific goal of the present invention to make available computerized market tools able to support any privatization policy chosen by government policy makers, including making possible the universal distribution policy outlined below.

The universal vesting in the citizenry of newly democratic nations of ownership in large state enterprises is both desirable and feasible. The current crises in social welfare threaten the transition to free markets and democracy. Large state enterprises are key. They are a major societal asset capable of providing a social "safety net" in addition to a "trampoline" of opportunity. Their effective privatization is a precondition to a free market economy. Universal vesting of the future ownership interest in large state enterprises strengthens the "safety net" and "trampoline" by broadly distributing a major asset. It strengthens the prospects for a free market economy by equitable, fast and effective privatization.

The conventional wisdom which writes off universal vesting as a laudable but unrealistically idealistic objective is wrong. The idea that ownership should be awarded to stakeholders, such as those already fortunate enough to happen to be employed at successful enterprises on the day they go private, would randomly redistribute and concentrate wealth to the advantage of a quite small percentage of the population. Even extremely widespread share-ownership is consistent with management acting in the shareholder interest, by means of polled voting and executive compensation tied to stock market valuation.

Universal vesting can promote the transition to free markets by immediately resolving the legal and economic issue of ownership rights. In the process, it can help legitimize the process of transformation. While entrenched interests and nostalgia buffs remain potent forces, it would seem that the inchoate clout of the entire citizenry is also something to be reckoned with.

The road to democracy can be rocky. For example, there is a real danger of "famine, social upheavals and chaos" in Russia. The result can be catastrophic feedback loops among undesirable social processes. Social disarray can cause famine and epidemics. Famine can lead to mass migrations, the breakdown of sanitation service, and epidemics of infectious diseases. After an initial period of kinship and concern for vulnerable members of society, family and social structures can disintegrate into survivalism and lawlessness, leading to riots, insurrections and revolutions. Even if such calamities are avoided, there remains the all-too-realistic hazard of a decades-long political stalemate which would block economic restructing and positive social transformation. These are dangers which pose a true current threat to international security.

Economic devastation is a major issue in many newly democratic nations. Many of the citizens live in absolute poverty. By some standards, the danger of a depression has already come to pass. The worst-affected groups include the homeless, the unemployed or low-paid, some elderly and most families with three or more children—comprising 25% of the population in Hungary. Over forty million citizens of the former Soviet Union had income below the subsistence minimum. Deindustrialization, which leads to a service economy requiring a more educated workforce, may tend to increase homelessness. In 1988, over 200,000 people in the former Soviet Union were officially cautioned to discontinue a "parasitic way of life"—code for vagrancy, begging and sponging. That same year, 7.5 million elderly received minimum pensions amounting to 55 rubles or less per month.

Children, especially ethnic minorities or those with single parents, and youth seeking first employment, constitute particularly vulnerable classes. In the mid-1980s in the former Soviet Union, divorces left 700,000 children with a single parent each year; 300,000 children lived in state-run children's homes or boarding schools; and 700,000 lived in foster homes. In 1991 in the former Soviet Union, juvenile delinquency increased 20% in a year, 160 hooligan groups of teenagers operated in Moscow, while more than 1,200 organized gangs existed nationwide. There is a danger that an integenerational cycle of declining education and income will create a permanent underclass. A strong social safety net by the government is clearly needed.

A number of policies provide an important, if standard, response to social welfare problems. For example, the social safety net designed by the former Soviet Union to fulfill—with such a noteworthy lack of success—the constitutional right of each citizen to employment, free education and health care was comprised in roughly equal parts of consumer transfers and monetary transfers. Financial reform then dictated the curtailment of enterprise subsidies, causing monetary transfers to increase. But now economic contraction has burdened the system and eroded the safety net.

In reaction, the 1991 Soviet budget trebled the payroll tax from 12% to 37%, in order to finance pension reform and a substantial increase of over 35% in nominal welfare expenditures. To cope with inflation, presidential guidelines indexed wages at from 70% to 50% (declining by income level), and indexed pensions at 100% with tightened eligibility, while providing a minimum consumer basket. The Soviet Employment Law provided for unemployment benefits, job training and public works. Ukrain proposed unemployment benefits of 70% of the last wage for 3 months after price liberalization, 50% for the next 6 months, falling then to 40%, but no less than the minimum wage nor more than the average wage.

Many of the policies now needed to attempt to maintain a viable social safety net, in the context of extreme budget constraints, are straightforward even if difficult to implement. Eligibility criteria need to be tight. Delivery of services must be efficient. Western aid must be coordinated effectively. A "food" stamp program should replace price controls of even essential goods such as bread and energy, in order to allow complete price liberalization. School meals should be fully maintained, while food kitchens and other basic services by private organizations should be strongly encouraged. Physical and personnel defense assets should be evaluated for social service, perhaps organizing decommissioned soldiers into a domestic service corps.

The United States experience with the New Deal "alphabet agencies" designed to combat the Great Depression should be carefully evaluated as unemployment swells. The Civil Works Administration (CWA) hired more than four million workers within three months. The Public Works Administration (PWA) sought to revive construction and restore the infrastructure. The Works Progress Administration (WPA) built 617,000 miles of new roads, and built or repaired 124,000 bridges and viaducts, 120,000 public bridges, and 30,000 stadiums, parks, playgrounds and athletic fields. The Civilian Conservation Corps (CCC) hired jobless youth and young adults for conservation projects. The National Youth Administration (NYA) employed 800,000 at its peak with an out-of-school program resembling the WPA, and with an in-school program of part-time jobs to reduce competition with adult jobseekers.

President Roosevelt stated critical guiding principles: the "alphabet agencies" should pay more than welfare but less than private employment, while serving as many needy people as possible with the available funds. Congress has subsequently mandated that jobs programs should provide useful services and meaningful employment without displacing private employment or government operations.

It is paradoxical that the explicit goal of the newly democratic nations—the destatization of resources and employment—may be accompanied by massive government works projects. It is important that this paradox be resolved by emphasizing Roosevelt's guiding principles and the Congressional mandate: jobs programs should be designed as temporary support and focused training rather than assured carriers.

Large state enterprises are typically of central importance in the economies of newly democratic nations. For example, the state sector of the former Soviet Union represented 96% of the "value added" in commerce and industry Soviet state firms accounted for 90% of industrial employment. Subsidies commanded by state enterprises there reached macroeconomic importance at 18% of GNP. But since this has roughly equaled revenue from enterprise taxes and transfers, to a first order approximation privatization with hard budget constraints would not affect the budget deficit, or the state's ability to finance the social safety net.

State-owned industrial enterprises are typically also a remarkably valuable portion of national wealth in centrally planned economies. For example, in Poland, the book value of firms to be privatized was about eight times total private savings.

Since large state enterprises are such a large component of the economy in a typical newly democratic nation, they represent a key element in the transition to a market economy. Perhaps all economies are "mixed", in the sense that they contain some private enterprises, if only via a black or grey market, and also contain some enterprises either owned outright by the government or awarded heavily-regulated franchises. Even so, the "center of mass" of an economy along the private-public spectrum is of critical significance. One reason is because "private" enterprises contribute much more effectively than "public" enterprises to price discovery reflecting private rather than bureaucratic utility functions.

Therefore, the "private" versus "public" nature of an economy will strongly influence the realism of its pricing mechanism. A small number of "public" enterprises in a free economy may not cause a large amount of distortion, since they are embedded within an efficient pricing system. However, perhaps counterintuitively, a number of "private" enterprises in a controlled economy can cause severe distortion by arbitrage between the two regimes. An example of such arbitrage is buying up undervalued and therefore scarce resources in the controlled market, causing supply disruptions, in order to resell on the private market.

The result is that the fundamental nature of an economy strongly influences the effectiveness of its pricing mechanism. This results in a premium for early, concerted and massive privatization. Since large state enterprises so dominate the economy in a typical newly democratic nation, their privatization is essential to a realistic pricing mechanism and a market economy. Privatization of large state enterprises can also promote efficiency, competition, capital formation and dynamic management.

However, twin dangers in the privatization of large state enterprises have already rooted themselves in the Russian language: privatizatisiya (privatization) is already called prikhatisatsia (piratization), while the government-preferred term razgosudarstvleniye (destatization) ironically can also be interpreted as "the falling apart of the state." The public receptivity to, and willingness to bring about, privatization is also a valuable societal resource subject to dissipation. While privatization which is equitable, fast and effective can ultimately benefit almost everyone, right now privatization worries too many and benefits too few. Breakthroughs and novel approaches to privatization are needed.

Privatization of large state enterprises should be viewed as a major economic component of the new social contract being developed to substitute for communism, which promised "from each according to his ability, to each according to his need." Perhaps as part of a healthy historical trend to hold governments to the standards which they themselves have ennunciated, the dissolution of the Soviet Union has created the opportunity to achieve more fairness and egalitarianism than was ever approached during its 75 years of existence. This opportunity can be seized by allocating ownership in large state enterprises directly to the citizenry, with a minority interest retained by the state to finance social welfare. This would advance individual security by serving as a "safety net" of a meaningful amount of resources to people in need.

Universal distribution of ownership in newly privatized large state enterprises to an entire citizenry is equitable. This is because the resources of the entire society created and maintained those enterprises. Therefore, universal distribution is imbued with legitimacy. This perception of legitimacy has important positive feedback into social stability. In contrast, "spontaneous privatization" or "anarchic appropriation" is viewed as illicit, while the distribution of enterprises to their employees is perceived as randomly favoring a minority of workers who happened to have been dealt a winning hand by the central planning agency.

Besides being equitable, universal distribution of ownership in newly privatized large state enterprises is also fast. Property rights can be immediately established in the entire citizenry "at the stroke of a pen", without any first order wealth distribution effects based on the establishment of "enterprise boundaries." This can avoid a backlash caused by plundering associated with delays in assigning property rights. Speed is also essential for economic "Pareto" efficiency. Earlier achievement of irreversibility in privatization positively reinforces investment, thereby enhancing the sustainability of privatization as it evolves from the "noisy" to "mature" phase.

Universal distribution has many advantages in addition to equity and speed. It can simplify tax collection by levies against earnings of individual portfolios. If some enterprises with roots extending beyond current state borders have a corresponding transboundary distribution of ownership, that might be one element of an Economic Union. The cohesiveness of such an Economic Union could be affected by the apportionment of any governmental residual minority interest between an enterprise's new sovereign and the other new states, and by any preferential entitlement of local citizens. Universal distribution would also promote the evolution of gender roles by placing women on a more equal financial footing with men, thereby strengthening the social safety net by empowering the primary caregivers.

Vesting in the entire citizenry the ownership rights to privatized large state enterprises would immediately increase household wealth, and subsequently increase household income via dividends, encouraging individuals to spend more freely. This could provide a Kenyesian stimulus to help revive devastated economies. The transfer of resources directly to the citizenry would also provide capital for the small business sector, where even a moderate investment can create a large number of workplaces. Such incubation of numerous small private enterprises is essential to a healthy economy. In this sense, universal distribution serves not only as a "safety net" but also as a "trampoline", providing economic opportunity to individuals which directly enhances their personal liberty.

So far, other distribution schemes have been favored over universal distribution. In Poland, only 30% of shares are allocated to the citizenry, and even those are through financial intermediaries. Another 30% is reserved for Polish or foreign investors or the treasury, 20% goes to pension funds, 10% to commercial banks and 10% to enterprise employees. The Russian privatization program provides preferential options to workers and management for roughly 40–50% of the capital of an enterprise, with vouchers distributed to the public to bid for the balance.

The conventional wisdom is that universal distribution is a "non-starter" policy because of the need to accommodate stakeholders, the need for external discipline over management and the board of directors, and the difficulties of quickly achieving either privatization business plans or truly general individual ownership. It is therefore necessary to carefully consider each of these questions.

An enterprise by its nature involves stakeholders such as employees, pensioners, banks, creditors and local governments. By definition, business systems evolve an accommodation between stakeholders and enterprises—otherwise the class would not be considered a stakeholder. In most states, business systems are embedded within a matrix of more or less clearly defined legal rights and customary practices. Such an infrastructure of law and custom is not yet in place in newly democratic nations. One line of reasoning then concludes that it is necessary to accommodate stakeholders by distributing to them an interest in ownership.

However, blurring distinctions among stakeholders is counterproductive. The shareholders have ultimate control over an enterprise, and are entitled to its residual value. If all stakeholders were to be accorded this status proportional to their financial interest and political clout, then enterprise ownership would become a crazy-quilt patchwork of national and local governments, banks, creditors such as other enterprises, institutions, investors, board members, management, workers, and the general citizenry. Such an outcome would impose significant opportunity costs on household wealth and individual welfare. Unless the accommodated stakeholders usurp a sufficiently great windfall, this could even degrade their own welfare relative to more appropriately tailored financial support, by narrowing their portfolio and increasing its riskiness.

This classic example of a stakeholder is the enterprise employee. One concern has bene that workers unplacated by a sufficient ownership interest might sabotage an enterprise or otherwise thwart its privatization. However, once a decisive resolution to the allocation of ownership is reached, with a schedule to phase out enterprise subsidies, it is difficult to see how a worker would benefit by jeopardizing the source of this or her paycheck. A similar concern is that workers might quit to form their own company, in some form of "spontaneous privatization." To the extent such a process merely carries on the same business with the same clientele and capital equipment, it could be declared illegal and subject to the restitution of all subsequent profits to the state. However, to the extent that manpower is drained from inefficient, bureaucratic or monolithic organizations to new enterprises responsive to current market demands, that is a healthy process of "creative destruction."

Another common argument is that distribution of enterprise shares to employees is necessitated by their clout. But workers of industrial enterprises can be replaced if their demands become inequitable, especially during an economic depression with collapsed demand and increasing unemployment. Also, industrial workers represent only a small fraction of the citizenry. In Poland, such workers are only 30% of the labor force, and represent about 15% of the population. In the former Soviet Union, the largest 44,000 industrial enterprises employed about 35 million workers, representing only 12% of its population. In fact, worker ownership amounting to management control is a potential hazard which can degrade enterprise performance.

The allocation of stock to workers who happen to be employed at an enterprise on the date of its privatization is inadvisable, because it concentrates wealth randomly. However, an ongoing stock compensation plan for employees can be a legitimate component of compensation negotiations. Unlike the effectively random initial conditions of profitability as determined by a history of central planning directives, enterprise performance after privatization and hard budget constraints take effect will be strongly correlated to employee performance. In sum, the best way to accommodate enterprise employees in particular, and stakeholders in general, is to design a process of privatization which maximizes the prospects for the success of the enterprises in which they hold stakes.

It is worth quantitatively exploring the implications of two alternative scenarios in allocating ownership interest. Scenario 1 envisions distributions to the entire citizenry. Scenario 2 reserves 25% for workers of individual enterprises. In scenario 1, the workers of industrial enterprises as a class have 12% of all stock in the form of a portfolio, but in scenario 2 they have 12% of 75% of such "portfolio" stock plus 25% of the stock in their enterprise which aggregates as a class to 34% of all stock. From this perspective, the class of workers of industrial enterprises is almost three times a well off under scenario 2, and therefore could be expected to prefer it over the universal distribution of scenario 1.

In general, if the amount reserved for employees of large state enterprises equals the fraction R (e.g., 0.25), and such workers represent the fraction W (e.g., 0.12) of the population, then the ratio by which they, as a separate class, are better off than under a system of universal distribution is:

Relative Welfare of Workers at Large State Enterprises=$(1-R)+W/R$.

However, this perspective insufficiently distinguishes among affected classes and their relative interests. Since a considerable portion of newly privatized enterprises might fail or attain no significant stock market valuation, there are actually at least three relevant classes: "lucky workers" of industrial enterprises which succeed, "unlucky workers" of industrial enterprises which fail, and the rest of the population.

Under the pro forma assumption that half the enterprises fail, in order to award 6% of the population almost five times as much stock, 94% of the population is correspondingly made worst off by 25%. For perspective, assume a pro forma book value equal to eight times private savings, and a 25% minority interest retained by the government in a social welfare account. In that case, 94% of the population would see its average financial savings increase by less than five times while the lucky 6% would receive a windfall of almost thirty times average financial savings. In this case, a "lucky worker" would enjoy a relative advantage of more than 6 to 1 over other citizens. If even less than 75% of distributed stock vests in the entire citizenry, the resulting disparity would increase. The concentration of wealth by random redistribution of such a magnitude could erode the perceived legitimacy of capitalism and democracy, jeopardizing reform and social stability.

In general, the relative advantage of a "lucky worker" over other citizens is:

$$\text{Lucky Worker Relative Advantage} = \frac{[SW(1-R)+R]/(SW)}{(1-[SW(1-R)+R])/(1-SW)}$$

$$= \frac{R + SW - 2SWR - S^2W^2 + S^2W^2R}{SW - SWR - S^2W^2 + S^2W^2R},$$

where R is a fraction of large state enterprise stock reserved for enterprise workers, S is the fraction of enterprises becoming successful, and W is the fraction of the citizenry represented by workers at large state enterprises.

Besides calling into question the legitimacy of the transition process, such a random concentration of wealth would represent an inferior economic strategy. While it is not possible to construct a single best social welfare function either by aggregating individual utility functions or even by examining societal choices, it appears that the increment to financial welfare of lucky recipients would be less than the decrement to financial welfare of the rest of the population. One reason is the diminishing marginal utility of increases in wealth. Another reason is because the enterprise stock is riskier in the lucky recipient's portfolio. The increased risk is due to the tripled exposure of an individual stock relative to the general market and also due to the dramatically high correlation between the value of a lucky recipient's enterprise stock (comprising over 80% of financial savings) and his or her job. This increased risk results in a higher implicit discount rate and a lower present value of the earnings stream. It would be more efficient, albeit transparently inequitable, to appease industrial employees by either direct cash payments or by simply increasing their proportionate share of stock in all enterprises combined. A better alternative would be for industrial employees to liquidate part of their allocation from a universal distribution in order to purchase shares in their employer, according to individual choice.

Another common objection toward universal distribution to the entire citizenry is that it would dilute ownership rights so as to preclude effective control over the board and management of an enterprise. The theory is that shareholders elect a board of directors accountable to them; the board of directors establishes broad policies and strategies, and appoints and oversees the chief executive officer (CEO) and perhaps other top management; the board of directors and top management have a collective fiduciary duty to conduct the affairs of the corporation in the best interests of the shareholders; top management hires officers which can speak on behalf of the enterprise; officers hire non-officer employees who can in turn form a supervisory hierarchy. If the results are unsatisfactory in the context of the competitive marketplace, then the board of directors is expected to remedy the situation—if necessary by replacing top management. If the board of directors fails to adequately serve the shareholders' interests, then the shareholders in turn elect different directors.

However, in reality the responsiveness of a western corporation to its shareholders is often inadequate. A series of common corporate tactics can entrench management and dilute effective shareholder control: inside directors (members of management also serving on the board of directors), golden parachutes (lucrative termination clauses in management employment contracts), proxy fights (management waging battles over shareholder votes adversely affecting its position) and poison pills (unpalatable corporate changes automatically triggered by a successful takeover). The disciplinary backstop is the capital marketplace, but takeover premiums of typically 50% demonstrate the insulation enjoyed by management.

Shareholder control over top management and the board of directors in the context of extremely widespread shareholdings can be facilitated by several policy choices: the modulation of corporation law, shareholder voting using polling techniques and the delegation of authority. Corporation law can reflect widespread shareholdings in several ways. To promote representation on the board by minority factions, directors can be elected by cumulative voting without unnecessary classes. Voting quorums can be set at low levels. Tender offers to take enterprises private can be encouraged by reducing the required thresholds of shareholder approval.

Shareholder votes can also be implemented with polling techniques. For a given decision, the enterprise would determine (consistent with applicable regulation) what percentage ownership represents the threshold between large and small shareholders. It would then submit the decision to each of the large shareholders, and a number of small shareholders selected at random. Each large shareholder vote would be weighted according to the number of shares voted, while each small shareholder vote would be weighted equally according to the total amount of small shareholdings divided by the number of small shareholders selected. However, the probability of a particular small shareholder being selected would be an increasing function of the number of portfolio shares. Statutes and regulations can specify maximum thresholds and minimum polling sample sizes as a function of the size of the enterprise and the importance of the decision.

Shareholder control can also be concentrated by delegation of authority. Delegation of investment authority can provide market discipline as delegatee-organizations perform investment research resulting in the sale of shares of under-performing enterprises. Sales of a particular enterprise's shares would tend to depress the share price, reducing the value of compensation shares to the management or workers. Recipients of compensation stock in well-performing enterprises would likewise be rewarded by share purchases increasing the stock price. Delegation of voting authority can also concentrate shareholder control by serving as an on-going and comprehensive "proxy" delegation.

Another very powerful way to align the interests of shareholders, top management and the board of directors is to tie executive compensation to the stock market valuation of the enterprise. The idea is to determine by statute that a CEO's annual compensation is a fixed multiple of national average wages, plus a fixed percentage of total outstanding shares to be issued from the enterprise treasury. Corresponding formulae for the board of directors, president and perhaps executive vice-presidents would be incorporated into the privatization business plan. This approach can be characterized as an emergency incomes policy designed to align the interests of the board and management with the interests of the shareholders. While incomes policies are generally defined to be anti-inflation devices, the sense of curbing exploitation of inherent market power would apply here.

Fixing CEO compensation as a multiple of national average wages plus a percentage of total outstanding shares has empirical support from the experience in a mature market economy like the United States, where CEO annual compensation can be expressed a a linear function of stock market valuation. This functional relationship between CEO annual compensation and stock market valuation is equivalent to:

CEO annual compensation=26.3×(national average wage) +0.0034% of (stock market valuation)

This reflects a high "base" U.S. executive compensation and a relatively low percentage of average total salary—14.5%—associated with stock market valuation.

Associating 100% of U.S. CEO annual compensation with stock market valuation while keeping the same average CEO compensation yields:

CEO annual compensation=0.023% of (stock market valuation)

In general, to associate $S$ % of CEO compensation with stock market valuation, while deflating the average CEO compensation to $D$ % of U.S. practice, the following formula should be used:

CEO annual compensation=26.3×$D$%×[(100−$S$)/85.5]×(national average wage) +0.0034%×$D$%×($S$/14.5) of (stock market valuation).

For example, the associating 80% of compensation with stock market valuation, and deflating average compensation to 50% of U.S. practice, yields approximately:

CEO annual compensation=3×(national average wage) +0.01% of (stock market valuation)

Two issues of validity arise in the foregoing analysis: the linearity and the meaningfulness of the association between CEO compensation and stock market valuation. Addressing first the issue of linearity, the best alternative to a linear correlation is a correlation between the logarithms of the two variables. Indeed, in the original sample of 216 points, the correlation coefficient of the two variables was just 0.258, while the correlation coefficient of their logarithms was 0.523. However, restricting the range of CEO compensation ($300K to $1,600K) and of stock market valuation ($300M to $30,000M), and thereby excluding the four highest and lowest instances of each variable, yields a sample of 200 observations with roughly comparable linear (0.484) and logarithmic (0.547) correlation coefficients.

Next, the nature of any non-linearity can be assessed by performing regression analysis on sample sets of the data stratified by stock market valuation. The regression coefficient (of the independent variable—also stock market valuation) is 0.0034% for the entire data set, 0.0081% and 0.0022% for the lower and upper halves of the stratified data set, and 0.241%, 0.0206%, 0.0068%, 0.00064% by ascending quarters. The pattern of coefficients decreasing as stock market valuation increases strongly suggests nonlinearity. However, the coefficients are 0.00065%, 0.0064% and 0.0013% by ascending thirds, eroding confidence in the robustness of any such pattern.

In addition, stratifying the data by the number of employees fails to demonstrate any need to compensate for enterprise size. The regression coefficient (of the independent variable—stock market valuation) is still 0.0034% for the entire data set, but becomes 0.0027% and 0.0025% for the lower and upper halves of the stratified data set, and 0.119%, 0.0018%, 0.0045%, 0.0018% by ascending quarters. The lack of any strong pattern here is particularly significant, since reasonable estimates of the number of employees of a newly privatized firm should be available—unlike for estimates of stock market valuations. It seems fair to conclude that while there may well be nonlinearity, over a suitably restricted range a linear approximation is statistically defensible in the context of an emergency incomes policy. This is particularly cogent, because it is a linear association which allows compensation to be set at a base rate plus treasury stock equal to a fixed percentage of shares, entirely avoiding the need to value the compensation shares.

In addressing next the meaningfulness of the association between the two variables, it should be noted at the outset that stock market valuation is not represented as solely determining CEO compensation in U.S. practice. It can also to a degree serve as a functional surrogate for other collinearly related variables. To explore this issue, a cross-correlation matrix [was calculated] for CEO compensation, stock market valuation, age of CEO, years with company, years as CEO, profit, sales, assets, number of employees, an index of diversification into related industrial sectors. Stock market valuation is clearly the independent variable with the highest correlation (0.48). This conclusion is robust even using the logarithm of (either or both of) the CEO compensation and the "extensive" independent variables (sales, assets and number of employees (but excluding sometimes-negative profit)). It is possible that the significant correlations between stock market valuation and profit (0.46), sales (0.66), assets (0.63) and number of employees (0.53) increase the explanatory power of stock market valuation. However, the low correlation coefficients between the residuals (from the regression of CEO compensation versus stock market valuation) and the unused independent variables support the conclusion that it is not necessary to include multiple variables for a meaningful regression estimate.

While stock market valuation explains CEO compensation better than the other factors considered, the correlation remains imperfect. Therefore, if there is no "random" component to compensation, unconsidered factors play a significant role. Clearly, policy-makers need not go to any great length to preserve the influence on compensation of factors such as any network of reciprocity between CEOs and the compensation committees of boards, when such a network is not positively correlated to the economy. However, a sophisticated marketplace for management employment undoubtedly takes into account significant and meaningful factors which are perhaps quantifiable only in the salary outcome itself. But it may unfortunately be likely that in many newly democratic nations, self-serving reciprocal networks are liable to have a greater effect on compensation than sound judgment calls concerning the unquantifiable characteristics needed to successfully lead enterprises into a newly-free marketplace.

At any rate, the point is that setting CEO compensation as a multiple of average wages plus a percentage of outstanding shares is not prescribed as an optimum approach for mature market economies. Rather, it is proposed as an emergency incomes policy to align management and shareholder interests in furtherance of a critical policy objective: privatizing large state enterprises as rapidly and effectively as possible.

Stock compensation would begin upon the privatization date specified in a business plan approved by some sort of Privatization Board. Vesting of accrued shares would occur only upon certification by the Privatization Board that any demonopolization goal which it had stipulated had been achieved. To further reduce the possibility of monopoly rent accruing to management or the board, the Privatization Board could confiscate a percentage of accrued compensation shares corresponding to its estimate of the proportion of the enterprise market valuation which arose from monopoly rent subsequent to privatization. An exception would be that no confiscation would be allowed if demonopolization were achieved within a "safe-harbor" time interval. To encourage successful spin-offs in the process of demonopolization, the motivation to retain as large as possible a stock market base should be reduced. Therefore, a spin-off should pay a corresponding cash bonus to its parent's board and management team (as of the spin-off date), by issuing and selling on the market its own treasury stock. Statutory compensation stock could eventually be terminated by individual enterprises by the choice of a sufficient plurality of shareholders.

To complement a statutory incomes policy for CEO annual compensation, the alignment of the interests of the board of directors and the rest of management with shareholder interests via compensation can be operationally achieved in the privatization business plan for each enterprise. Allocating the non-CEO portion within the privatization business plan would preserve the flexibility to adapt the compensation plan based on the number and stature of directors and executive vice-presidents. Those executive vice-presidents would also be ideally placed to become CEOs of spin-off companies, as enterprises transform from "u-form" to "m-form."

Any inclination to begrudge compensation as a percentage of stock market valuation for even very large firms should be resisted. Enterprise size is not a definitive determinant of stock market valuation. For example, the stock market valuation of 17-year-old Microsoft, with 10,000 employees and sales of $1.8 billion, is now as great as that of the world's biggest manufacturer: 84-year-old General Motors with 766,000 employees and sales of $124 billion. This is because the stock market more or less reflects the present discounted value of the expected stream of future, after-tax earnings. The boldness and initiative of top management, which would be strongly encouraged by unlimited upside potential, will play a vital role in determining which enterprises become highly valued and which ones fail. While 0.01% of stock as a component of annual compensation can strongly motivate the CEO of a very large enterprise, it is a very small price indeed relative to the potential return to shareholders.

One concern is that privatization business plans just won't happen, due to resistance. However, the enterprise leadership responsible for preparing the plan would presumably be heavily represented in the subsequent treasury stock compensation pool. It would therefore be highly motivated to rapidly achieve the privatization and demonopolization milestones—stock compensation "start" and "vesting" respectively. Since the enterprise leadership is capable of providing incentives or disincentives to key employees even in the preparation phase, resistance can be minimized.

Indeed, a healthy tendency may arise for relatively dynamic managements to rapidly formulate business plans including contiguous and desirable organizational subunits before they are claimed by a potential competitor. There may be a corresponding "spontaneous liquidation" of undesirable and unclaimed interstitial organizational subunits. Therefore, dynamic management teams enthusiastically supportive of privatization will tend to acquire control over the salvageable portions of the organizational infrastructure. In the meantime, maladaptive state enterprises will atrophy as subsidies are phased out and already-privatized enterprises refuse to imprudently extend credit. As a consequence, both the markets and the production factors of maladaptive state enterprises will become available to the private sector.

Another concern is that it could be impractical to quickly generate privatization business plans. This issue can be analyzed by exploring what such plans should contain, and how they can be generated. The privatization business plan should contain a selective update of currently available information, a list of claimed physical facilities, and a comprehensive if provisional organization chart including all available names. The generation of such privatization business plans is potentially a highly leveraged focal point for international assistance. Western academics, businessmen, lawyers or accountants, assisted by students or trainees in related fields, could provide guidance along with access to portable computers and menu-driven software for expedited diskette submittals.

The privatization business plan should also attempt to identify potential "interferences", or potential boundary disputes with other enterprises. The full disclosure of such potential interferences would help demarcate interenterprise boundaries. The enterprise making the disclosure would be rewarded by a stronger presumption of validity for an approved business plan. Otherwise, a conflicting privatization business plan filed within a certain period of time by a "contiguous" enterprise might possibly be awarded part of the first enterprise.

Privatization business plans can be simplified by statutory resolution of certain major—yet highly uncertain—potential rights and duties. Each enterprise should be subjected by law to the "polluter pays" principle for future, and only future, liability. This clearly locates future environmental rights in the public, while maintaining societal responsibility for past environmental damage. Another major issue is interenterprise debt. It could be reasonable to discharge such debt upon privatization, since it largely reflects a legacy of distortions resulting from central planning. The net result is a newly private enterprise able to write its future on a clean slate. Such an enterprise can attract risk capital as a viable investment opportunity.

Universal distribution can be simplified by allocating each citizen a single "Stock Market Unit" (SMU), consisting of the right to one share of each enterprise privatized within some initial period, such as by the end of 1993. This asset is designed to be fungible and liquid. To motivate enterprise leaderships to privatize within that initial period, the statutory treasury stock compensation pool for the board and top management should be significantly reduced for any necessary follow-on interval. Such a follow-on interval would have a corresponding tranche of "SMU2s". Therefore, part of the fluctuation in value of a SMU before its cut-off date would arise from changing expectations about the extent and timing of future privatization. SMUs would be a market index of expectations about future privatization prospects, and would help create a nationwise constituency for fast, massive and effective privatization.

This approach is more practical than either standard auctions or voucher schemes. A big problem with auctions is the absence of sufficient capital willing and able to bid realistically. Auctions can also be dominated by pools of capital raised by organized crime or through "spontaneous privatization", undermining the legitimacy of the transition to capitalism. In contrast, the SMUs represent a distribution of capital to the entire citizenry, not only obviating the problem of insufficient capital, but bolstering the legitimacy of transition as well.

Nor are the problems associated with auctions completely cured by voucher schemes. While vouchers can also be universally distributed either gratis or at nominal prices, they impose a major information burden. Many of the citizens missed in voucher schemes are precisely those in the most need, such as the illiterate or homeless. Vouchers also require the bidder at auction to value individual enterprises without a time series of reliable accounting data and in the context of major social upheaval. This problem is magnified because the information burden comes with time deadlines. Vouchers are wasting assets, becoming worthless after the corresponding auctions.

In contrast, SMUs provide a relatively stable investment imposing a minimum information burden without deadlines. They are more stable because they represent an entire portfolio, rather than a single enterprise. The information burden is reduced to the decision whether to keep, sell or buy more SMUs at the current market price. Since SMUs would be a major standardized asset, price discovery and dissemination should be more effective than for a myriad of individual enterprises. Each participant in the SMU market would then be a beneficiary of the price discovery achieved by the market's most sophisticated participants.

The absence of deadlines is fundamentally significant to the impact of SMUs. A legitimate and perhaps quite sophisticated strategy can be to simply hold them and collect the dividends. Since the original distribution is liable to resemble low-priced out of the money call options with extremely uncertain valuation and high implicit discount rates, a "hold strategy" will allow recipients to reap the capital appreciation as the society stabilizes, leading to falling risk premia and implicit discount rates. The alternative is for that appreciation to accrue to sophisticated risk capital, with adverse distributional effects. To constrain the rate at which people make investment mistakes, vesting intervals such as 20% a year for five years could be imposed on alienability. This could correspond to the expected learning curve in the society, while stabilizing the market by avoiding sudden oversupply. However, to accelerate portfolio adjustments, stock ownership concentration, and a reversal of the communist legacy of "learned helplessness", immediate vesting may well be preferable.

The distribution of SMUs can take the form of either script or of a book-keeping entry of the entitlement in a computer system. A particular subclass of citizen such as adults could be provided the option to claim a certain percentage of the entitlement in the form of script. This script would be stamped each year upon claiming the accrued aggregated dividends of the underlying portfolio of enterprise shares. Since this script would represent a store of value and might well become to a degree a medium of exchange, it could be viewed as a quasi-currency. While it would fluctuate with the stock market value, it might represent an inflation hedge against debasement of the official currency, enhancing the ability of the government to control inflation. It would also facilitate price discovery for SMUs, as large numbers of individuals engaged in daily transactions at fluctuating market prices.

However, the major form of distribution of SMUs can be as an entry in a computer system. Such a system can present to the entire citizenry a much wider range of investment opportunities. Such breadth of individual choice is valuable. Citizens should be free to bid portions of their SMUs along with cash and mortgages at privatization auctions of small state enterprises such as shops. Each individual should have the opportunity to exchange SMUs for selected foreign currencies, government debt, shares or debt of a specific enterprise and annuities. The government can use the residual minority interest in enterprises kept in its social welfare account as a capital base to insulate its budget from the actuarial uncertainties of such annuities, and to underwrite insurance for private financial institutions selling such annuities as principals.

As part of the social safety net, part of each individual's entitlement to ownership in large state enterprises could be placed into a restricted "social security" subaccount. The only allowed investments in this account could be SMUs, government debt or lifetime annuities, although provisions can be made for withdrawal in cases of hardship. While it is unrealistic to expect such a social security subaccount by itself to secure the financial future of indigent citizens, it may be a helpful resource, especially for the elderly.

As some of the most vulnerable citizens in a society, children should be entitled to a share. A child's share should remain inalienable until his or her majority, except for health or education needs. A corresponding allotment for children born in the future should not be funded by enforced new share creation, which could debase the market. However, it would be possible to fund such allocations for future births by means of a wealth or income tax.

To help fund welfare programs for the homeless, indigent or incapacitated, the local or regional governments can be allotted SMUs corresponding to an estimate of the number of citizens who are missed in the registration. Any citizen registering after a certain grace period such as a year would obtain his or her entitlement out of the account of the local or regional government, motivating it to register everyone fast to maximize both regional welfare and its own funding base. Combining registration for entitlement to stock rights with voter registration could even provide positive economic reinforcement to the democratic process.

Appropriate initial logistical constraints can ensure practicality. Transactions by individuals executed by the government are entered over the period of an investment cycle, which could initially be as long as a year. Transactions can be mailed or submitted in person, to either a local or central registry. As financial institutions and the societal infrastructure develop, telephone orders could be placed to brokerage houses which would guarantee authenticity, and relay the transactions to the central registry. Transactions are progressively combined and sorted by a hierarchy of computer centers, resulting in a comprehensive transaction data base. At this point, the central computer facility processes the transactions, calculates market-clearing prices, and updates portfolios with current asset accounts. Even half a terabyte of storage, enough for a per capita storage allocation of five kilobytes in a population of one hundred million people, would cost under one hundred thousand dollars.

The first step is to formulate a privatization strategy. This need not be a master plan attempting to inappropriately specify choices in advance of future uncertain events. Rather, it should establish the direction of the privatization policy and fix property rights, while preserving the flexibility to deal with future uncertainty.

The first element of privatization strategy is the choice of distribution technique, whether auction, voucher or universal vesting. Immediate universal vesting of the future interest in privatized large state enterprises (i.e., SMUs) is the policy of choice. Universal distribution is equitable, fast and effective, and its achievement by automatic vesting is more practical and equitable than voucher schemes. The universal vesting must be apportioned between rights to script and computer accounts. At least some portion of the SMUs could be available in script form, to solidify public support, facilitate price discovery and inhibit inflation. Once a distribution technique is determined, recipients must be identified. Potential recipients include citizens, workers, management, banks, pension funds, charitable institutions, local or regional governments, in addition to a portion being retained by the national government. One effective policy would reserve a minority interest to the appropriate levels of government in social welfare accounts, and distribute the rest to the entire citizenry. This series of choices is important to make early, since the establishment of property rights is a precondition to an effective market economy.

After property rights are established, another series of policy choices must be made. If a computer system is implemented to support universal vesting of SMUs in all citizens, then the eligible investment opportunities must be specified. Alternatives include government debt, other debt including annuities, enterprise shares and foreign currency. Then the types of transactions on the assets which the system will support must be specified. In particular, the structure of any method of delegating investment authority must be addressed.

Finally, timing must be addressed. Some timing issues must be determined at the outset, such as the cut-off privatization date for enterprises to be included in SMUs. Others should also be resolved right away, such as the period after which new registrants such as the incapacitated or homeless would be allocated their portion out of a local or regional governmental account. But some timing issues can be resolved later, such as the safe harbor time interval for achievement of demonopolization goals without subjecting previous management or worker compensation stock to partial confiscation.

Upon formulation of a privatization policy, the appropriate parts must be promulgated into law by legislation, decree or agency regulations. For example, a legislature could establish that each citizen is entitled to one Stock Market Unit (SMU) representing one share in each large state enterprise privatized before the end of 1993, an additional ¼ SMU to be held in a restricted social security subaccount, ¹⁄₁₀ SMU to be available to adult citizens as script upon registration (but with the option to leave it on account), and one SMU2 corresponding to subsequent privatizations during the first follow-on interval. As another example, legislation or decree could promulgate an emergency incomes policy whereby each CEO of a newly privatized large state enterprise would be paid the equivalent of three national average wages plus enterprise treasury stock equal to 0.01% of shares outstanding.

Once the initial planning is completed and legislation has been enacted to define the fundamental outlines of a privatization strategy, the system must be implemented. As the policy apparatus of a country analyzes the changing situation and the policies of the national government evolve, additional legislation and decrees will be needed. To facilitate government management of a complex and challenging process, authority can be delegated to an agency such as a Privatization Board to review privatization business plans, promulgate regulations and oversee demonopolization.

Besides the legal and regulatory structure, it is necessary to actually establish the systems to carry out the privatization strategy. These include personnel systems to input and validate transactions, security systems to prevent embezzlement or privacy violations, and computer systems to process the transactions. Lessons learned from the cycle of operation, maintenance and adaptation will then feed back into regulation and legislation.

One way to structure an implementation strategy is by means of PRIVATIZATION PLANNER™ (a system to help plan for privatization) and PRIVATIZE!™ (a new system to achieve universal privatization). PRIVATIZATION PLANNER™ (a system to help plan for privatization) provides a systematic overview of key policy choices in the privatization process. PRIVATIZE!™ (a new system to achieve universal privatization) sets out the design of a computer system to advance privatization and free markets. In combination, they support the development and the implementation of a privatization policy such as universal vesting of SMUs.

Different groups will have different roles in the proposed system. The government is responsible for formulating privatization policies and overseeing their implementation. This initially involves legislation or decrees which resolve property rights, establish a management incomes policy as appropriate, and delegate authority to an agency to oversee the privatization process. Subsequently, that agency must promulgate regulations to provide guidance to and constraints upon the process. For example, professional organizations which accept investment authority over part of a portfolio in return for a share in the profits or assets could have a limit on the rates they charge. The agency itself must in turn be overseen by the legislature, executive and/or courts, who are in turn responsible to the citizenry in whom the entitlement to SMUs was created.

Enterprise management must first develop a privatization business plan. This will often involve a search for identity, as leadership concentrations in an interwoven industrial infrastructure determine where their organization ends and their suppliers and customers begin. A key step in this phase is the emergence of a CEO, board of directors and top management, along with their stock compensation agreements. This process should involve interaction with the Privatization Board, so that the resulting privatization business plan is likely to be the product of negotiated decisionmaking, rather than the start of regulatory confrontation. In the case of heavily concentrated industries, executive vice-presidents should be placed in positions to coalesce any spin-offs needed to achieve demonopolization goals required by the Privatization Board.

The Privatization Board may be authorized or directed to consider wage compacts as part of the Privatization Business Plan, in order to cushion the shock of transition on workers. This is inadvisable if workers have already received SMU entitlements including social security subaccounts, since it would constrain management from maximizing the value of the enterprise to its shareholders—the entire citizenry. However, management and workers should both seriously consider including stock compensation as part of wage negotiations.

Upon privatization, enterprise management can begin to accrue compensation stock. Vesting of such stock should be deferred until the Privatization Board has certified demonopolization. If demonopolization occurs after a safe harbor time interval, the Privatization Board should confiscate the part of management and worker compensation stock which it estimates to be attributable to monopoly rent arising subsequent to privatization. Spin-offs which survive an initial interval should liquidate a number of treasury shares determined by Privatization Board regulations and pay the proceeds to its former-parent organization's management as constituted at the date of spin-off.

Enterprise managements can also ensure that their organizations serve as data entry foci into the computer system. Enterprises would generate transaction data for their own portfolio, and records of employees along with negotiated stock compensation amounts. In addition, enterprises can serve as data entry centers for transactions by their employees, and perhaps on a compensated basis even for other members of their local community.

The proposed system places all citizens into the role of portfolio owners. As such, they are capable of evaluating alternative investments and entering transactions at local registries or enterprises.

While part of each owner's portfolio would remain on account with the government (for instance, at least the social security subaccount), the remainder could be transferred to the individual's choice of financial institution for safekeeping and access.

From the perspective of processing centers, each is a node in a hierarchical network of information flow. Each center receives transaction data from different sources, sorts and combines that data, and passes it to the next higher node. The lowest nodes may receive virtually all transaction data from paper forms requiring data entry. Progressively higher nodes such as regional centers would typically handle as input the diskettes or tapes generated by the lowest nodes, and then send a single set of tapes on to the the next higher node. Eventually, a single composite transaction data base is produced at a central processing facility. This data base is then processed to execute transactions as appropriate, and the results transmitted to custodial financial institutions.

Confusion inevitably accompanies great social change. In particular, the transition from centrally planned economies to free markets involves the deprogramming of decades of indoctrination. Basic concepts are alien. The "invisible hand" of Adam Smith seems a fairy tale. Profits all seem illicit. Private property seems anti-social. Initiative seems dangerous, while the danger of joblessness and poverty is frightening. The result can be bewilderment, and inconsistent or even directionless policy.

The implementation of the proposal for universal vesting of the future interest in privatized large state enterprises will be associated with more confusion. The concept of vesting an intangible future interest may seem novel. The different participants in the system—government policy makers, enterprise management, portfolio owners and processing centers—may not at first fully understand their respective duties and options.

The antidotes to confusion are clear policy directives, education and training, and patience. Each of these antidotes can be available. The universal vesting of the future interest in privatized large state enterprises may be novel, but it can be sold with clarity to a public in search of a legitimate system leading to better living standards. Education and training have international and domestic aspects. Exchange programs where citizens of newly democratic nations travel abroad to learn while members of successful democracies take their place to teach are already growing in scope. On the domestic side, while there is typically a dearth of teachers qualified to teach advanced courses in western business practices, the educational infrastructure is in many cases a strong asset capable of redirection. Finally, a certain interval of time is needed to successfully navigate such an expanse of social change, so patience is essential.

The proposed policy involves the development of personnel systems, security systems and computer systems. All can be associated with notorious delays. Delays erode credibility, and credibility is the coin of democratic government.

Two factors mitigate this problem. First, actual property rights can be created immediately upon the promulgation of universal vesting. These property rights are real, and could immediately be used to bid at auctions of shops, flats, land, government equipment and other state property. Script for a portion of the new property rights could be issued right away to tangibly demonstrate the transfer of wealth from the government as custodian to the individual citizens as owners. Second, any delay in operationalizing the personnel, security and computer systems will not impair the new asset—alternative investment choices will only be deferred. If the initial delay coincides with a period of stabilization, then exorbitant discount rates could be punctured and share values could increase, to the benefit of the citizenry. At any rate, the challenge in such an endeavour and its potential advantages would be no secret, and given the opportunity, a society collectively can have great sophistication in its evaluation of the performance of a government.

The other answer to delays is priority. One weakness of centrally planned economies has always been the inability to handle well the myriad simultaneous decisions facing a modern society. On the other hand, they often have demonstrated the capacity to do "any thing." That is, given enough priority, a particular objective could be achieved in world-class fashion. If the transition to democracy goes hand in hand with free markets, and if free markets are contingent upon privatizing large state enterprises, it would seem appropriate for policy makers to allocate the human and material resources to achieve that goal as rapidly and effectively as possible.

It can be assumed that every possible error will happen. Fictitious citizens will be registered. Homeless, incapacitated and illiterate citizens will be missed. Actual portfolio owners will request transactions they don't mean. Data entry personnel will input transactions other than directed. Intermediate processing centers will lose segments of the transaction data base. The central computer facility will encounter software and hardware glitches, and operator errors. Choice of delegatee-organizations, choice between alternative orders, and matching buy and sell orders will occur at approximate prices. Assets intended to be transmitted to custodial financial institutions will be delayed or lost. At each stage of the process, individuals outside government without authorized access and individuals within government with authorized access will attempt to use information improperly. While each of these problems occurs in mature market economies as well, it can be expected that their magnitude will be greater in newly democratic nations.

However, problems will occur with any privatization policy, and the proposed policy can effectively address problems which do arise. Standard audit practices can raise the cost of fictitious registration: requiring local authentication at initial registration, random checking of the legitimacy of registrants, analysis of data for suspicious patterns, penalties assessed against the social welfare allocation of local governments with poor records in allowing fictitious entries, and restitution of falsely claimed assets with additional penalties corresponding to the number of false registrations likely to be missed. Allocating late registrants (e.g., a homeless person registering after a year) their entitlement out of the local government's social welfare portfolio will encourage it to initially miss as few as possible.

To prevent portfolio owners entering transactions they don't mean, information can be distributed to clarify choices. Still, some mistakes are part of the tuition in traversing the learning curve. If data entry personnel enter erroneous records, they can be canceled. If segments of the transaction data base are missing, the regional centers can attempt to validate completeness and request missing segments. When errors are caught, any consequential loss sustained by the portfolio owner can be made good out of the responsible government's account, which would likewise accrue any consequential gain.

At the central computer facility, processing disruptions may necessitate recovery procedures such as reprocessing from the latest backup. Software glitches may be identified and patched. The degree of price approximations will be a function of processing power available, more a function of western export licenses and international agency support than technological constraints. Transmittals to custodial financial institutions will be backed up and available for retransmittal as necessary. Improper use of the information data bases can be dealt with by law, so that what could have been Orwellian technology can instead be harnessed in the interest of economic security and individual liberty.

A fundamental advantage of the policy to universally vest future privatization interests is the immediate resolution of ownership rights. While the wealth transfer may seem intangible until distributed as script, used in a bid at auction, or accessible with a computer system, it is real nonetheless. It can boost current household wealth and future household income, providing a non-inflationary stimulus to the economy.

The proposed policy is superior to alternatives which include as recipients entities other than governments or citizens (e.g., enterprise employees). One reason is that to a first order approximation, with universal vesting the establishment of inter-enterprise boundaries does not affect wealth distribution. Indeed, it becomes in the interest of the citizenry and the hierarchy of governments to approve enterprise boundaries which maximize their aggregate rather than individual worth.

Universal vesting also provides an important safety net to individual citizens. The social security subaccount of an individual's portfolio can be restricted to portfolio stock, government debt or lifetime annuities. In case of hardship, withdrawals could be authorized for medical or living necessities. The allocations to children can provide needed support, finance education and help prevent intergenerational poverty cycles. In the process of providing an individual safety net, the social security subaccount will also reduce the social welfare burden on future government budgets.

The unrestricted portion of a citizen's portfolio is a valuable patrimony. It can be used to bid at auctions of small state enterprises, start a business, relocate a family, buy land or make alternative investments. While some individuals may be shrewder or luckier, all can receive the same economic opportunity. The result can unleash the economic power of decentralized decisions conforming to each individual's personal utility.

Universal vesting of future privatization rights can promote free markets. It can be instrumental in the rapid and effective privatization of large state enterprises, which is essential for valid price signals. It can create opportunities for alternative investments such as foreign currencies. It can also promote capital formation by accelerating the creation of markets in individual enterprises, accessible to citizens and foreign investors alike.

The proposed system incorporates the concept of promoting the transition to private financial institutions. Individuals can transfer assets (except perhaps from the social security subaccount) into approved custodial financial institutions of their choice. This can increase privacy, speed access and promote the ability to rapidly update investment strategies. This can also provide a source of capital to new financial institutions, which can then serve as capital intermediaries to enterprises in growth industries.

Wealthy democracies can play an influential role in the transition of newly democratic nations. But where do their interests lie? The spectrum of issues can be resolved into three interconnected and fundamental components: economics, national security and core values.

Russia by itself has a foreign debt of about $80 billion. It has stated it can only repay two to three billion dollars of the eight billion due in 1993. Any policy which stabilizes the economies of newly democratic nations and helps them grow will directly increase the value to the west of their foreign debt, while increasing the stability of the international financial system.

More broadly, the formula for western prosperity since World War II has been the Bretton Woods policy triad: progressively freer international trade, structural adjustments for progressively more flexible and responsive domestic economies, and medium-term domestic price stability. While the results have reflected the uneven application of this formula, it represents a viable objective for consensus in the current situation of global flux. From an economic perspective, it is in the interest of the west to include newly democratic nations in a system of progressively freer trade, as they progress towards market economies and more stable price systems.

Protectionism is not a sound economic argument to fear new or succesful market economies. To some, there may seem to be an historical analogy with post-war Japan or Germany, reconstructed with American support. However, the emergence of these states as economic and political leaders has been hailed as a major success of American foreign policy, despite the resulting economic competition. All nations can benefit from additional trading partners, even if newly emerged from autarky. This results from Ricardo's theory of comparative advantage: the new trading partners will be suppliers of goods or services for which they have a relative production advantage, they will provide new markets for goods or services for which they have a relative production disadvantage, and the exchange rate will appropriately adjust relative real incomes as a function of relative productivity. The resulting potential for mutual and real economic gain takes on added significance as even leading industrial nations struggle to raise their standard of living.

The linkages between the theory of comparative advantage and the Bretton Woods policy triad are clear. Newly democratic nations need price stability to fully participate in the global economy. As their participation grows, trade patterns will change and even successful market economies must flexibly adjust. To ensure equitable distribution of the gains which the theory of comparative advantage promises, international trade must be made progressively more free.

The transition of newly democratic nations to market economies has mixed implications for the national security of wealthy democracies. On one hand, there is a strong correlation between economic development and stable democracy, which in turn is empirically related to peace. On the other hand, newly democratic nations remain potential adversaries for which economic power could become a weapon of critical importance. Since economic power can be wielded as a weapon largely independently of military force, studies showing that only a minor amount of the variation in military force structure is explained by discretionary wealth are not dispositive. The United States has reacted to these mixed implications by adopting a policy which hedges against future uncertainty.

Any analysis of the western interest in aiding newly democratic nations should properly weight the importance of core values. Values are an integral aspect of national security. One list of fundamental American values includes self-determination, the dignity and worth of the individual, and the accountability of those in power to the people as the basis for international policies, implying that systems professing these values should be fostered. The Judeo-Christian heritage has provided the moral foundation for these American values.

Perhaps the most powerful nation-state in the world, together with its allies, can afford the risk of energetically aiding the transition of newly democratic nations. By fostering western values, the wealthy democracies would in a fundamental sense be reinforcing their own identities. Perhaps the scoreboard of democracy, up to 62 countries representing 44% of the world's population, can gain momentum as the half-way mark is passed. If fear of the Other is such a potent source of hostility, then perhaps the best way to make the world safe for democracy is simply to make the world itself democratic.

SUMMARY OF THE INVENTION

The present invention includes a computerized method of operating a market system, comprising the steps of: providing a computerized knowledge base incorporated in a computer system by which the knowledge base may be modified responsive to user evaluations and user contributions; formulating market system policies and parameters in accordance with contents of the knowledge base after any modifications made by the computer system to the computerized knowledge base; and on a digital computer, executing instructions to consummate market transactions by performing cross-price resolution, according to the polices formulated after any modifications to the computerized knowledge base.

In a variation on the invention, the present invention may further include steps of receiving transaction orders, including portfolio trading delegation orders; and executing trading delegation orders for which cross-price resolution converges, resulting in delegator/delegatee assignments by which a delegator's portfolio is managed by a delegatee.

In a further variation, the invention may include collecting and entering transaction orders into a computer system at a first level of a receiving hierarchy; combining the collected and entered transaction orders into a transaction file, by executing instructions on the computer system; writing the transaction file to a least one physical medium; and sending the physical medium to a second level of the receiving hierarchy.

Another variation on the invention may includes steps of collecting and entering transaction orders into a computer system at a first level of receiving hierarchy; combining the collected and entered transaction orders into a transaction file; and transmitting the transaction file to a second level of a receiving hierarchy over an electronic communication network.

In yet another variation, the invention may include a step of receiving orders transmitted electronically by individual users.

The above variations may be combined to form additional variations on the present invention. Additional aspects of the present invention will become apparent to those skilled in the art, on reading the following description.

BRIEF DESCRIPTION OF THE DRAWINGS

Like reference numerals indicate like elements in the Figures, in which.

DETAILED DESCRIPTION

The present invention will be better understood in view of the following description, read in connection with the figures. The following description relates primarily to an embodiment of the invention suitable for privatizing a large economy. However, this is merely an example, given for purposes of illustrating the principles of the invention, which may be practiced in a variety of other contexts, some of which are indicated at appropriate points in the discussion. Some details in the following discussion may be implemented differently, yet remain within the contemplation of the present invention.

Figure 1:
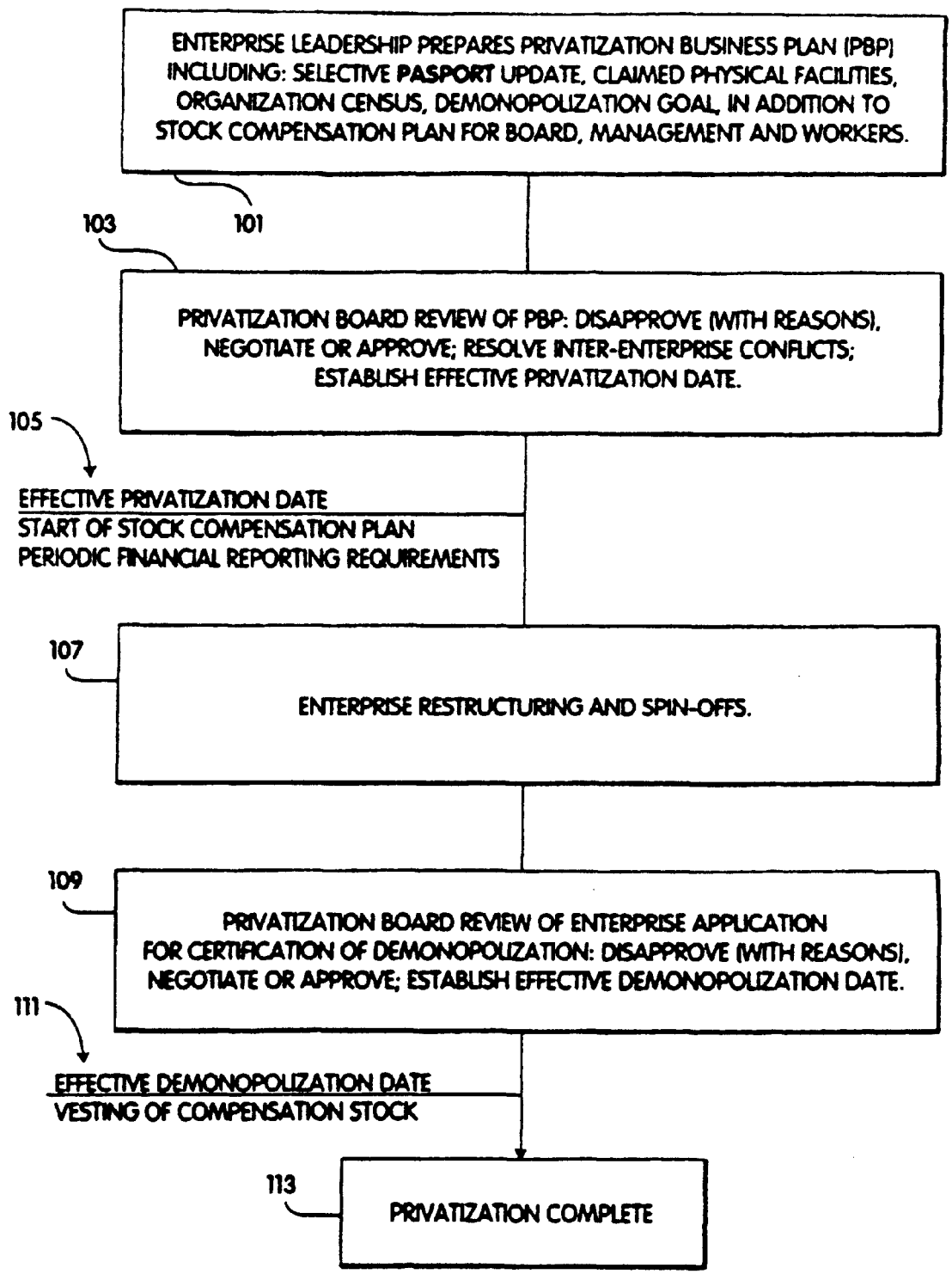
FIG. 1 is an overview flow chart of the privatization process contemplated by the present invention.

A basic process of privatization in accordance with the present invention is illustrated in FIG. 1. Various steps in this process are supported by computerized tools, such as will be described below. In order to understand the interrelationships between the computerized tools, it is first necessary to understand the privatization process contemplated by the present invention, though the invention is applicable to other processes, as well.

Each enterprise to be privatized is to undergo a process substantially as shown in FIG. 1. The enterprise leadership first prepares a privatization business plan (FIG. 1, Step 101). The plan should include such detailed information as the current productive capacity of the enterprise, the capital stock and labor force of the enterprise, a list of claimed physical facilities, a demonopolization goal as explained below, a stock compensation plan for board, management and workers of the enterprise, and such other elements as would conventionally be included in a business plan. Subsequently, the privatization business plan is reviewed by a Privatization Board (FIG. 1, step 103).

The Privatization Board has several options by which it may dispose of a privatization business plan. It may disapprove of the privatization business plan, along with reasons for that disapproval. The Privatization Board may approve of a privatization business plan, in whole or in part. The Privatization Board may negotiate with the enterprise regarding a privatization business plan which has been disapproved in whole or in part. Thus, the interaction between the enterprise leadership and the Privatization Board helps to ensure that viable privatization business plans are written and subsequently executed.

Often, the Privatization Board will find that a privatization business plan for one enterprise conflicts with a privatization business plan, current or published contemplated future operation of another enterprise. In such a case, the Privatization Board will resolve such inter-enterprise conflicts at the time of the review of the privatization business plan.

Finally, in the course of the Privatization Board Review, an effective privatization date 105 is established. Naturally, an effective privatization date is established only for privatization business plans which have been approved.

On the effective privatization date 105, the enterprise begins to execute its privatization business plan. The stock compensation plans described in the privatization business plan are implemented. Periodic financial reporting requirements are enforced.

In accordance with the plans laid out in the privatization business plan, the enterprise begins restructuring (FIG. 1, step 107). The enterprise may also initiate new, private, spin-off enterprises.

When the enterprise leadership has reason to believe that the goal for demonopolization set in the privatization business plan (FIG. 1, step 101) has been met, then the enterprise may submit an application for certification of demonopolization to the Privatization Board (FIG. 1, step 109). The Privatization Board again has the options of approving, disapproving, or negotiating changes to the application. When an application for certification of demonopolization has been approved, then the Privatization Board will establish an effective demonopolization date 111.

On the effective demonopolization date, the compensation stock from the stock compensation plans initiated on the effective privatization date will vest. At this point privatization may be considered complete (FIG. 1, step 113).

Figure 2:
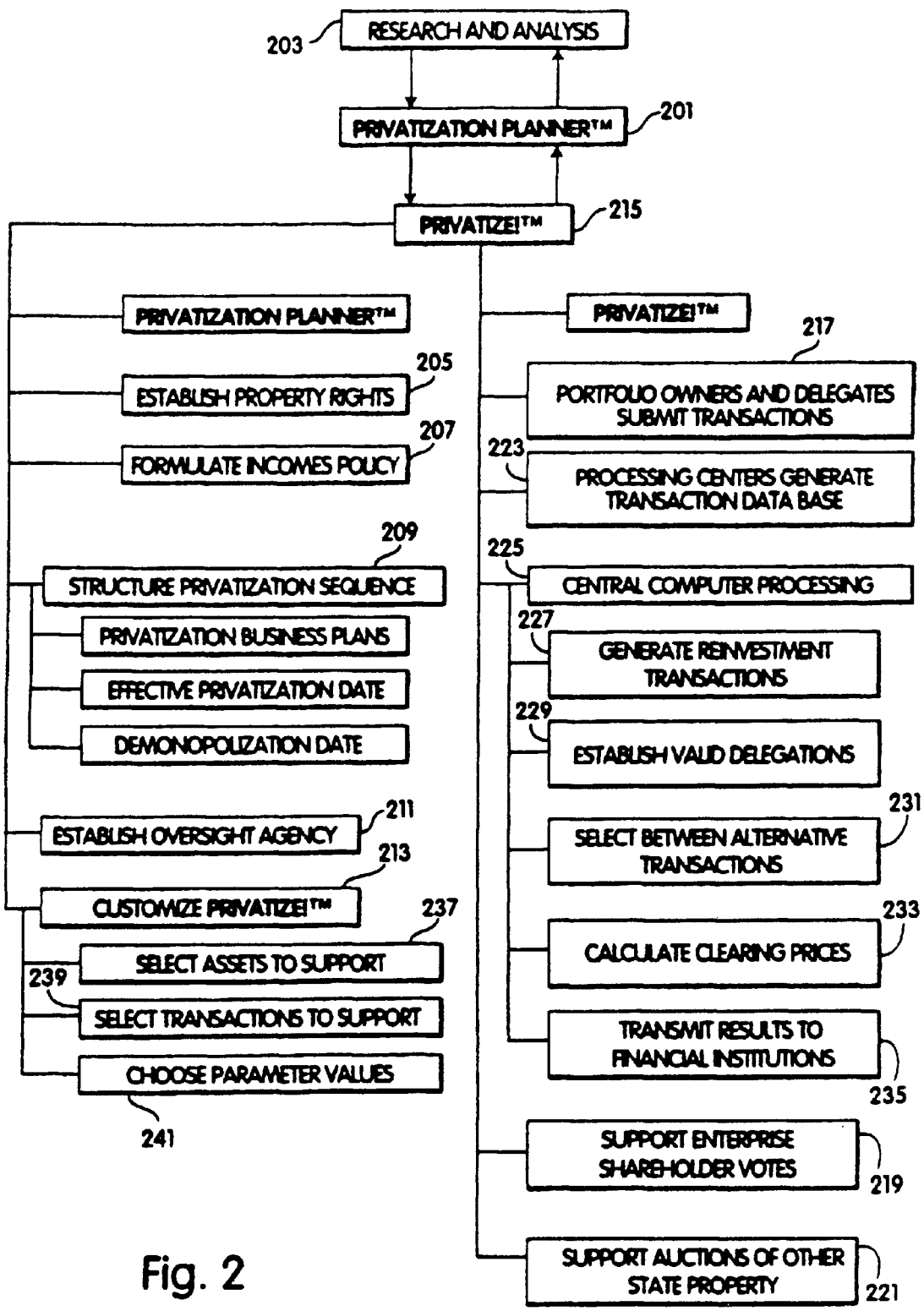
FIG. 2 is an organizational block diagram of the inventive privatization process and the tools for implementing the same.

The organization block diagram of FIG. 2 indicates how the tasks of privatization are divided among the computerized tools which are to be used to implement privatization. The tasks are divided into substantially two groups: planning tasks and transactional tasks.

Planning tasks include the establishment of policy, the formulation of plans, the setting of goals and dates, and the customization of the tools for supporting the transactional tasks. Supporting this aspect of privatization is the PRIVATIZATION PLANNER™ (a system to help plan for privatization) computerized tool 102. Research and analysis 203 is performed using this computerized tool, which adapts to changing conditions, as described below. This tool will enable a country's economic leadership to plan privatization policies including the establishment of property rights 205, the formulation of incomes policies 207, structuring the privatization sequence 209, establishing an oversight agency 211 and communications with and within that agency, and customization 213 of the PRIVATIZE!™ (a new system to achieve universal privatization) computerized tool 215 for management of transaction tasks.

The PRIVATIZE!™ (a new system to achieve universal privatization) computer tool 215 permits the economic leadership of a country to process transactions submitted by portfolio owners and delegatees of portfolio owners concerning the enterprises owned 217, support enterprise polled shareholder voting 219 and support auctions of other state property 221. File definitions, asset types, transactions and commands are described below. In performing these tasks, processing centers will generate transaction data bases 223, which are ultimately merged into a single transaction data base for processing. A central computer which processes the transaction data base 225 generates reinvestment transactions 227, establishes valid delegations 229, selects between alternative transactions 231, calculates clearing prices 233 and transmits results to financial institutions 235. The assets permitted to be owned and transactions permitted to be performed 239, by portfolio owners and delegatees are determined during a customization process 213 performed by the economic leadership of the country using PRIVATIZATION PLANNER™ (a system to help plan for privatization). The customization process 213 is also used to establish parameter values 241, such as the period over which the transactions will be processed, called the investment cycle period.

The described embodiments of the invention are contemplated as being implemented in a version of the C programming language. This choice yields a number of advantages. The C programming language is a subject of international standards. Therefore, it is suitable for use in various countries. Furthermore, it is extremely portable from one computer platform to another computer platform, without extensive re-coding of modules, except perhaps certain platform-dependent interface modules. Yet another advantage of using the C programming language is that compilers are currently available on most platforms which produce particularly efficient, fast code. This last advantage makes the invention suitable for implementation using PC hardware, when so desired.

Figure 4:
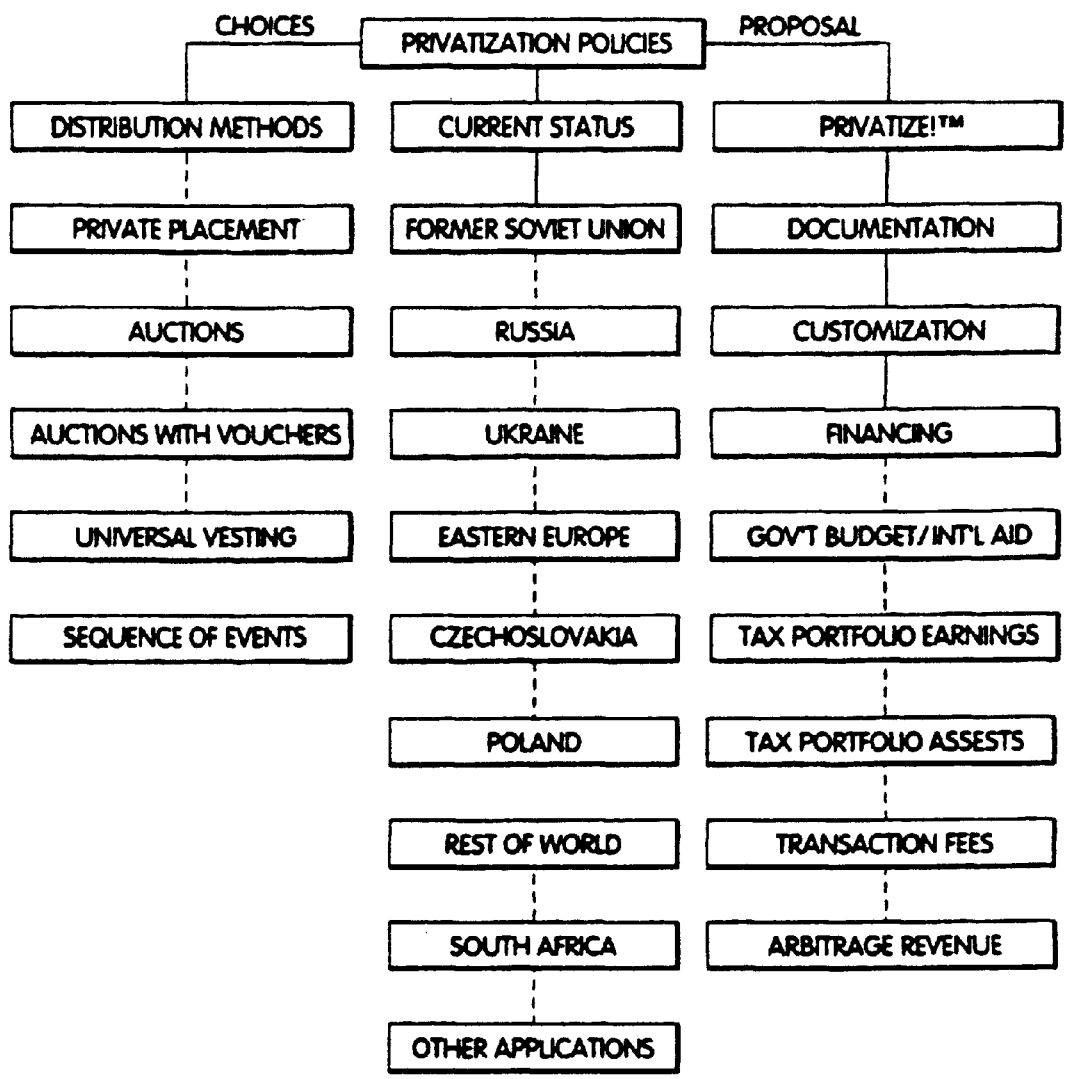
FIG. 4 is a concept map of the hierarchical structure of an initial knowledge data base for the privatization planner of the present invention.

The PRIVATIZATION PLANNER™ (a system to help plan for privatization) computerized tool is next described. The PRIVATIZATION PLANNER™ (a system to help plan for privatization) is a computerized collaborative knowledge base tool designed to support custom privatization of a country's enterprises. Of course, depending on the contents and organization of the initial knowledge base with which PRIVATIZATION PLANNER™ (a system to help plan for privatization) has bee initiated, it could be used in any application where it is desired to form a knowledge base which grows and evolves based upon user evaluations and proposed contributions. One such initial knowledge base is illustrated in the concept map of FIG. 4. Examples of such suitable applications of adaptive knowledge bases include: the pursuit of sustainable development; research into avoiding ethnic strife; movie rating systems used in video rental and sales stores; and a literary anthology for which authors are remunerated based on the popularity of their contributions. For example, the embodiment of the adaptive knowledge base invention is a tool to support the pursuit of sustainable development, designated as the "Sustainable Development Server" (a system to advance sustainable development), is achieved by adapting the identifying contents of the welcome screen, relabeling the name of the tool and subsequent screen displays, and using the same general purpose commands to create a structure of topics and associated pages of information relating to sustainable development. It is specifically contemplated that users may or may not be charged fees based upon the amount and nature of their knowledge base access. Contributors may or may not be remunerated based on the quantity, ratings and longevity in the knowledge base of their contributions.

The PRIVATIZATION PLANNER™ (a system to help plan for privatization) tool is implemented as a software program running on either one or more individual portable or personal computers in the hands of individual users or user groups, or accessible on electronic networks, including a worldwide network such as Internet. Individual users possess copies of relevant portions of the knowledge base for use with their copy of the tool The knowledge base of the PRIVATIZATION PLANNER™ (a system to help plan for privatization) tool is modified and updated based on evaluations entered by users of the PRIVATIZATION PLANNER™ (a system to help plan for privatization) tool. See FIG. 3.

Figure 3:
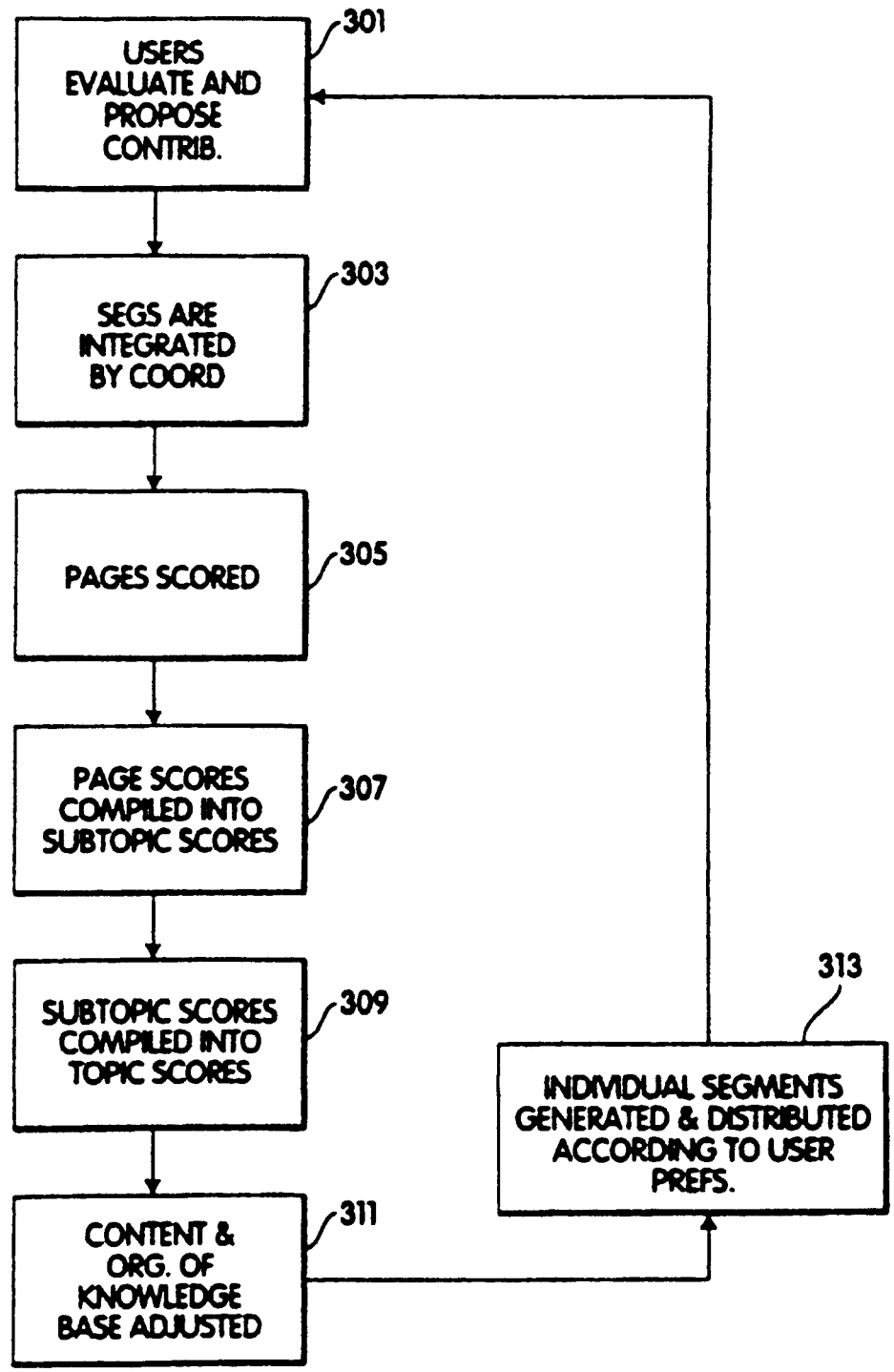
FIG. 3 is a flow chart of updating a policy knowledge base according to one aspect of the present invention.

The user evaluation cycle illustrated in FIG. 3 begins with users evaluating and proposing contributions (step 301) to the topics, subtopics, pages and organization of the knowledge base segment in their possession. The segments are then integrated (step 303) by a knowledge base coordinator operating a copy of the PRIVATIZATION PLANNER™ (a system to help plan for privatization) tool to form a complete knowledge base containing the integrated whole of the knowledge base segments previously possessed by the individual users. Next, the pages are scored by the PRIVATIZATION PLANNER™ (a system to help plan for privatization) tool (step 305). Page scores are compiled into subtopic scores (step 307) and subtopic scores are compiled into topic scores (step 309). Making decisions in accordance with the scores obtained in the previous steps, the PRIVATIZATION PLANNER™ (a system to help plan for privatization) tool adjusts the content and organization of the knowledge base (step 311). The adjustments are based upon some form of optimization of the scores obtained above. Finally, individual segments are generated and distributed in accordance with the user preferences (step 313).

Users may customize their usage of the tool, and can effectively access even very large numbers of entries using sophisticated keyword techniques and by filtering and sorting entries using date, evaluations by other users, and evaluations of the user himself using either actual evaluations or estimates based on past correlations or anti-correlations with other users. PRIVATIZATION PLANNER™ (a system to help plan for privatization) also provides an interface to a simulation of the PRIVATIZE!™ (a new system to achieve universal privatization) computerized marketplace, allowing users to simulate portfolio transactions and asset prices using the methods contained in the PRIVATIZE!™ (a new system to achieve universal privatization) tool.

The PRIVATIZATION PLANNER™ (a system to help plan for privatization) computerized tool permits distribution of segmented or partial knowledge data bases, based on individual preferences. The knowledge base may be distributed in whole or in part over a network or on such physical distribution media as diskettes and CD ROM.

After each user of the knowledge base has entered comments and evaluations to their own satisfaction, the segment on which they are in possession is returned through the network or physical media distribution channel to a knowledge base coordinator. The knowledge base coordinator merges the knowledge bases of all users into a single large knowledge base on a regular basis. The results of the various users' evaluations of entries in the knowledge base are then used by the PRIVATIZATION PLANNER™ (a system to help plan for privatization) adaptive e mechanism to eliminate entries which are of insufficient interest or value to users.

Although the adaptive function has been thus far described in connection with entries, or information content, the structure of the knowledge base is also subject to user evaluation. A knowledge base is organized into topics, which have both content and organization. Furthermore, evaluations are graded on both quantity and quality. That is, an entry or topic organization evaluation consists of both the amount of information associated with that topic and the value of the evaluation given by each user.

Figure 7:
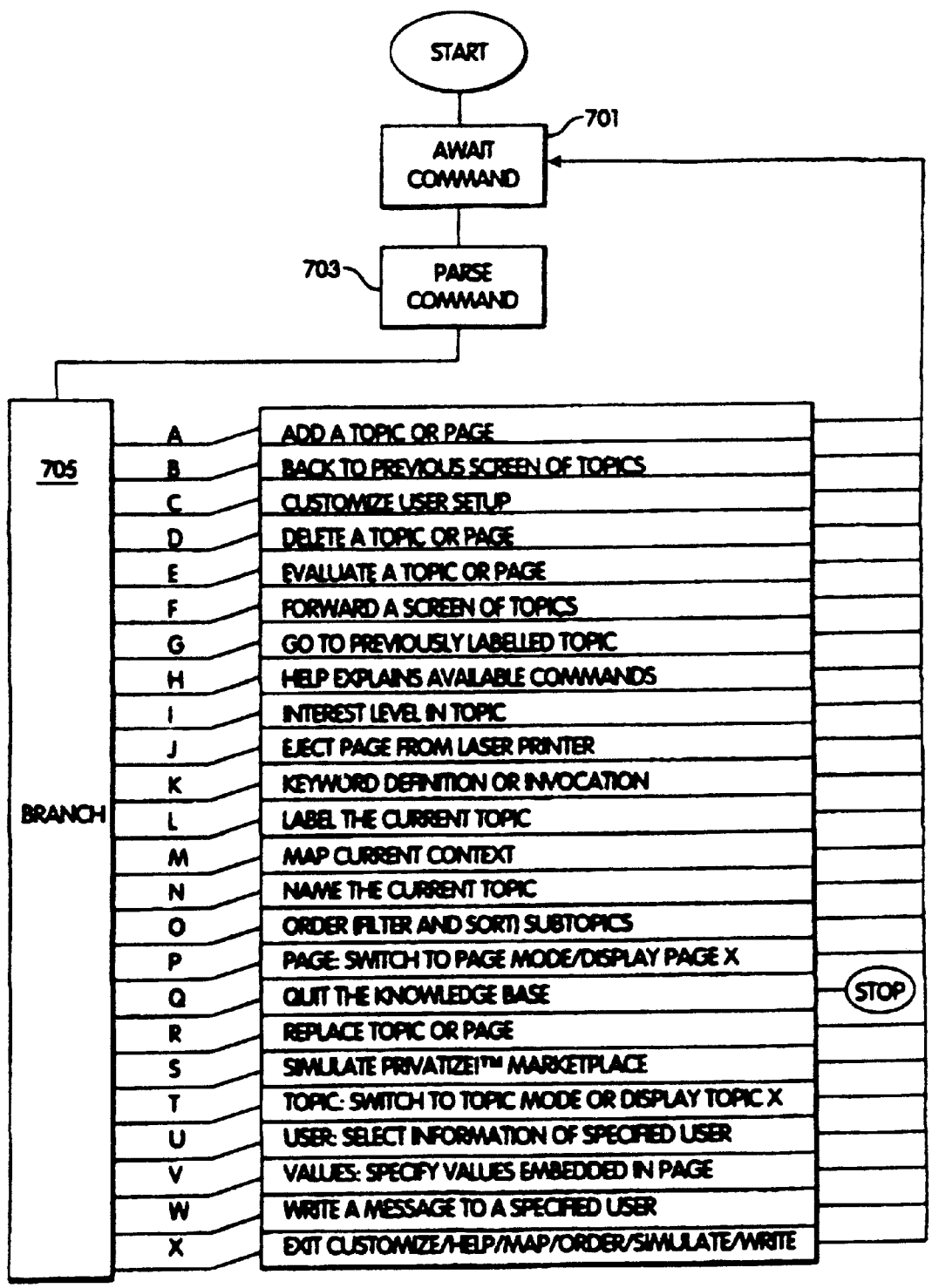
FIG. 7 is a flow diagram of the logic of the privatization planner embodiment of the adaptive knowledge base tool of the present invention.

A more detailed discussion of the logic of the method embodied in the PRIVATIZATION PLANNER™ (a system to help plan for privatization) aspect of the invention is now given in connection with FIG. 7. The PRIVATIZATION PLANNER™ (a system to help plan for privatization) tool is an event-driven tool, which executes a loop as now described.

The tool first enters a sate of awaiting a user's command (step 701). When a command has been entered, and confirmed if so required by a particular embodiment, then the tool parses to command entered (step 703) to determine which of several alternative actions to next branch to (step 705). In the C programming language, this action is commonly embodied in a CASE statement. Next, the action required by the parsed command is performed (step 707), after which control returns to the step of awaiting a user's command. Each of the commands implemented is invoked by a user by entering the reference designator of the branch from the step of branching (step 705) to the desired command action (step 707)

PRIVATIZE!™ (a new system to achieve universal privatization) is a computerized tool to support free markets in newly democratic nations. The tool is capable of implementing any privatization policy chosen by government policy makers, and in particular includes a capability to support distribution of shares in large state enterprises to an entire citizenry. Universal distribution of at least a portion of public assets, such as large state enterprises, can completely avoid the need to value such assets prior to privatization. This is advantageous in developing economies without any adequate means of achieving such valuations. It is also advantageous in and applicable to developed economies because it can avoid the large absolute inefficiency associated with even a modest relative underwriting valuation error. Legislation or a decree can vest in each citizen privatization rights in the form of Stock Market Units (SMUs). SMUs are a way to aggregate rights to equity in state enterprises into a current private asset, by defining a new financial instrument composed of one share in each enterprise due to be privatized over a fixed interval. While normally the fixed interval will begin on or immediately after the date of legislation and terminate at some future date certain, it is also possible to define intervals which are completely in the past or which are completely in the more distant future. For example, if the main SMU were defined to extend from the date of legislation to the end of the subsequent year, then a SMU2 could be defined to begin at the termination of the fixed interval of the SMU and continue for an additional year or more. SMUs can be immediately and freely traded. In particular, a citizen's right to a SMU allocation can be used in bidding for small state enterprises at once, even before implementation of the entire system. The PRIVATIZE!™ (a new system to achieve universal privatization) tool solves the problem in newly democratic nations that a stock trading infrastructure must quickly be provided to execute market transactions in the absence of a significantly developed communication and financial intermediation infrastructure. Thus, it is a particular feature of PRIVATIZE!™ (a new system to achieve universal privatization) that the files and methods used may be efficiently implemented using minimum hardware and in the absence of an advanced infrastructure. For example, communications are contemplated as performed using physical transfers of information on diskettes, tapes or other physical media when sophisticated telecommunications happen to be lacking. Similarly, the market resolution methods are suitable for implementation on personal computers (PCs) as well as large mainframes.

Other assets contemplated as being traded in accordance with the PRIVATIZE!™ (a new system to achieve universal privatization) embodiment of this aspect of the invention include stock or debt in specific enterprises, debt of governments or financial institutions, foreign currency, price level adjusted mortgages, in addition to flexibly specified annuities which are keyed to standardized actuarial tables and priced according to their implicit interest rate. This aspect of the present invention has many other useful applications. For example, assets such as natural resource right in Bahrain, air pollution rights in the United States, or the proceeds of a South African wealth tax collected either in the form of money or "in kind" such as in the form of stock, could be vested in a very large number of recipients or an entire citizenry, and a market place with an extremely broad investment opportunity set provided by this system. Appropriate bids and offers for any available asset can be made by any entity with an account on the system, including governments, organizations and individuals. One objective of this aspect of the invention is to provide a "springboard" to free enterprise in the context of a free market.

The tool also supports the creation of a "social security" account for each citizen, for example initially endowed with a supplemental allocation of Stock Market Units or newly privatized stock in individual enterprises by means of universal distribution. This can be a very attractive capability even in developed market economies where large state enterprises are to be privatized but policy makers wish to strengthen the social safety net in the process. The regulation of such social security accounts can specify that the Stock Market Units in these accounts can only be exchanged for government debt, lifetime annuities or other specified assets, but with immediate distributions when necessitated by hardship. Such regulation of social security accounts is support in the PRIVATIZE!™ (a new system to achieve universal privatization) tool. See, for example the Security transaction below. Additional allocation of Stock Market Units can be made to social welfare accounts of local governments in an amount corresponding to the number of citizens liable to be missed, for example due to homelessness. The result is a strengthening of the "safety net" for social welfare.

PRIVATIZE!™ (a new system to achieve universal privatization) supports the market for enterprise shares in a variety of ways such as dividend payments, stock subscriptions and "going private." It also provides subsets of shareholder lists for shareholder votes based on polling techniques. An embedded marketplace for the delegation of authority to professional investment organizations at competitive rates is included in the PRIVATIZE!™ (a new system to achieve universal privatization) tool to facilitate efficient markets and price discovery. These features of the market tool are additional examples of capabilities which can be valuable in developing and developed economies alike. It is specifically contemplated that users of the PRIVATIZE!™ (a new system to achieve universal privatization) tool may or may not be charged fees based on the amount and nature of their usage of the system.

The operation of the PRIVATIZE!™ (a new system to achieve universal privatization) tool is now described in connection with FIGS. 5 and 6.

The investment cycle begins with the input of transaction data into a hierarchical system of computers. This phase is complete upon the production of a comprehensive and sorted Transaction Data Base (XDB). This is composed of blocks containing all transaction data for a given entity, and sorted by ID code. This data base is then processed by means of five passes, in order to implement delegations as appropriate, establish asset prices, execute transactions as appropriate, and transmit the results to custodial financial institutions.

PRIVATIZE!™ (a new system to achieve universal privatization) is a general system capable of supporting a broad range of policy choices. It works in tandem with PRIVATIZATION PLANNER™ (a system to help plan for privatization), which provides a collaborative knowledge base in support of policy formulation. Policy choices such as the allocation of Stock Market Units to the citizenry will often be implemented by appropriate governmental transaction input to the PRIVATIZE!™ (a new system to achieve universal privatization) tool. Regulation such as the maximum number of transactions an individual or organization is allowed to submit, and technical specification such as the choice of field delimiters, are used to adapt modules such as GLOPARM as appropriate.

Figure 5:
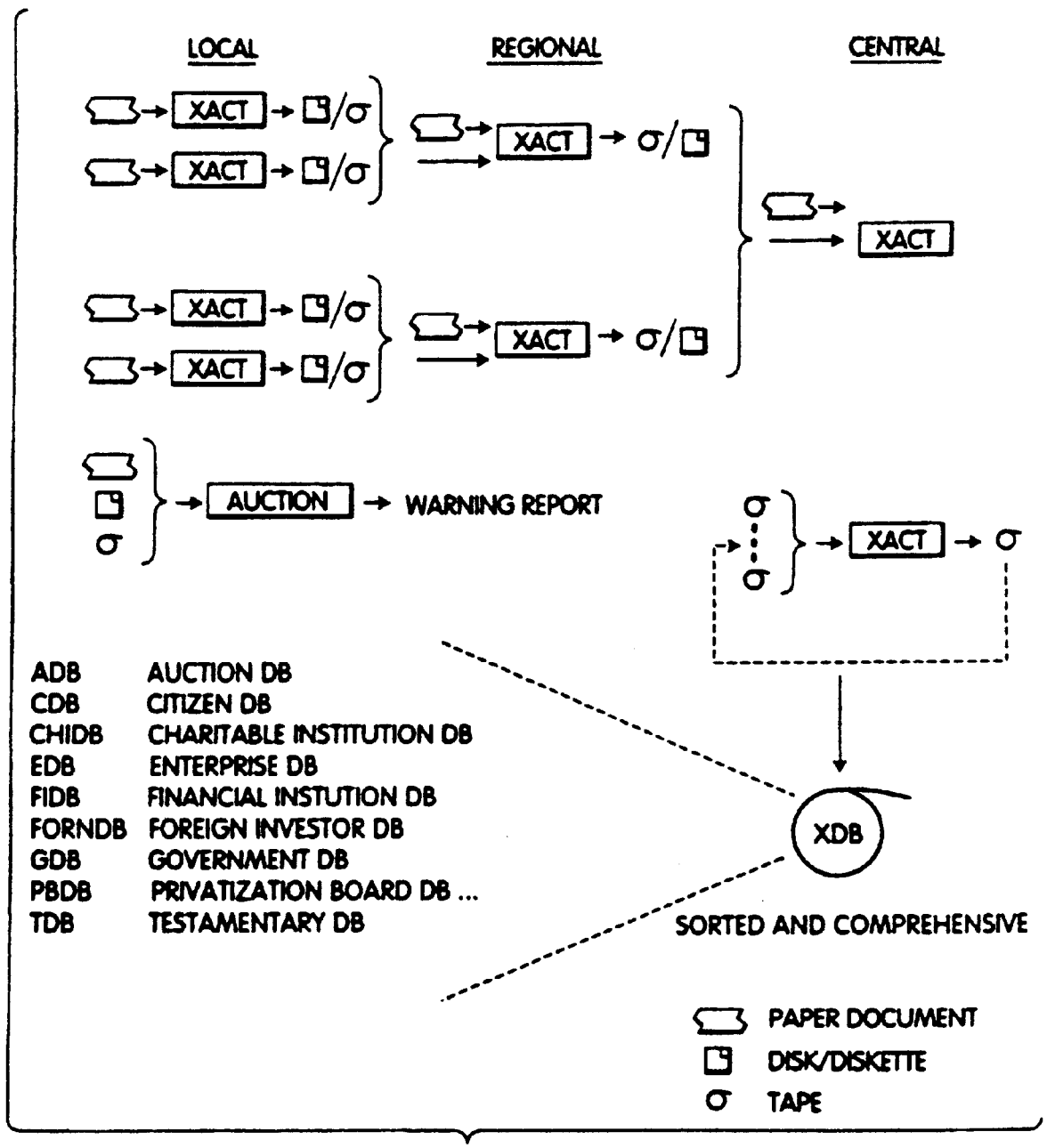
FIG. 5 is a flow diagram illustrating the formation of a transaction data base for use by the privatization implementation tool of the illustrated embodiment of the present invention.

The Transaction Data Base (XDB) is prepared as illustrated in FIG. 5 using module Transact (XACT). Module XACT requests the input devices, which can include the terminal and auxiliary storage such as floppy disk or take drives. The operator also specified the output device and the size of any random access disk file available for sorting.

As XACT reads transaction blocks from one or more input devices, it performs initial validity checks. If an error is found in the input from the terminal, the operator can immediately correct the transaction block, in addition to making any appropriate notation on the input forms. If an error is found in input from another device, the operator can enter additional transactions to cancel out the error and introduce a corrected substitute transaction.

Module XACT performs merge-sorting into main memory on the transaction blocks read in. XACT notifies the operator when it stores a sorted memory buffer onto disk, and when it merge-sorts any disk files to the output device. If a disk is unavailable, the sorted memory buffer is stored directly onto the output device. XACT provides the operator an opportunity to change the diskette or tape after each output cycle. This allows the output to be subsequently merge-sorted if multiple input devices are available.

The resulting diskettes or tapes are transmitted to the next higher node in the hierarchical network of processing centers either physically or electronically. For example, the network illustrated in FIG. 5 includes local, regional and central nodes. At the central computer facility, the operators generate a single comprehensive sorted XDB by iteratively merge-sorting the input. XDB should then be backed up and archived off-site. Throughout the process, the operators preserve the physical break-points in the series of tapes which correspond to the logical subdivision into categories of portfolio owners such as governments, enterprises and citizens.

Figure 6:
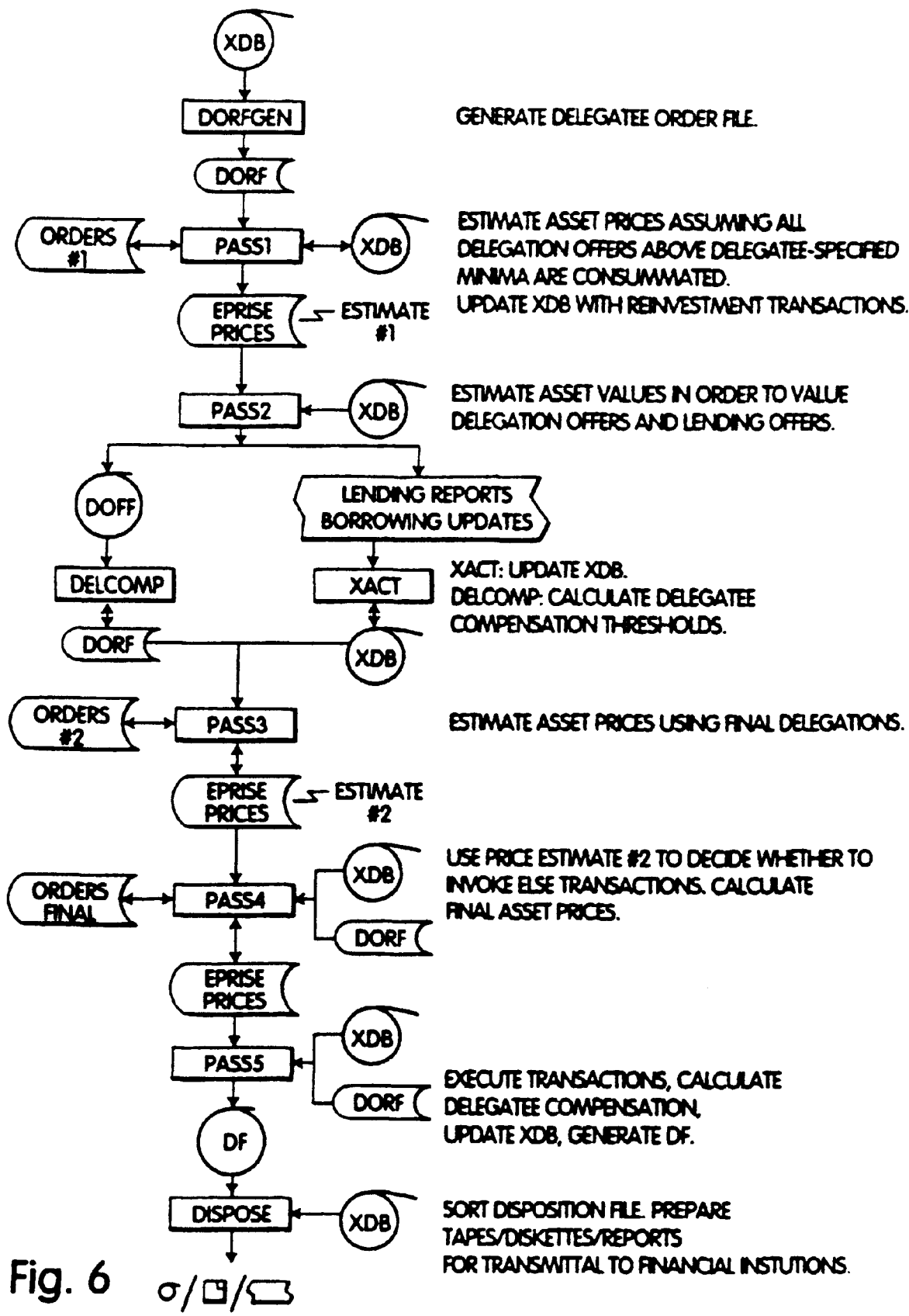
FIG. 6 is a flow diagram of a process for updating a transaction data base using the privatization implementation tool of the illustrated embodiment of the present invention.

As shown in FIG. 6, processing the Transaction Data Base (XDB) involves running a series of modules at the central computer facility. Detailed definitions of the files processed and the functions of the modules are presented below. Module Delegatee Order File Generator (DORFGEN) is run on the delegatee-organization subset of the XDB to create the random access disk file Delegatee Order File (DORF). Upon creation, file DORF should be backed up, to archive and to recover from processing disruptions. Likewise, module Enterprise File Generator (EGEN) is run with interactive input to create and maintain the random access disk file Enterprise File (EPRISE), which should also be backed up.

The operator then runs module PASS1. PASS1 first requests the tapes for the enterprise segment of XDB to update dividend information in EPRISE, which should then be backed up. PASS1 then requests the entire XDB tape series, generating the serial file ORDERS #1 and an update version of XDB containing reinvestment transactions. It then requests the tapes comprising ORDERS #1 so that module PRICING can calculate price estimate #1 and post it to random access files EPRISE and PRICES. The operator should back up EPRISE and PRICES, and then archive them, ORDERS #1 and the original XDB.

The operator next runs module PASS2, which requests tapes comprising the updated XDB, and generates the serial file Delegation Offer File (DOFF) and a lending report. The lending report may be distributed to selected potential large borrowers, who are given a brief opportunity to update their borrowing transactions. Any new borrowing transactions are input to module XACT, along with an appropriate subset of XDB including, for example, only the government segment and perhaps financial institutions or even other enterprises. Module XACT generates a new XDB subset, and the operator archives the subset being replaced. The operator then runs module Delegatee Compensation (DELCOMP) which requests the tapes comprising DOFF, and generates the random access Delegatee Order File (DORF).

Module PASS3 is run next. It request the XDB tapes and generates the serial file ORDERS #2. PASS3 then requests the tapes comprising ORDERS #2 so that module PRICING can calculate price estimate #2 and post it to random access files EPRISE and PRICES. These files should then be backed up and archived.

The operator next runs module PSS4, which again requests the XDB takes, and generates the final serial ORDERS file. It then requests the final ORDERS and posts the subsequently calculated final prices to file EPRISE and PRICES, to be backed up and archived.

In the final complete pass, the operator runs module PASS5 which requests the XDB tapes, generates a final updated XDB file, and also generates serial file Disposition File (DF). The intermediate set of XDB tapes should then be archived.

Module DISPOSE is then run, which requests the DF tapes and the financial institution segment of XDB. Module DISPOSE then generates a combination of reports and tapes or diskettes for transmittal to custodial financial institutions. A copy of these transmitted files and the input DF tapes should then be archived.

The above sequence of processing steps is described from the perspective of an operator of the computerized market tool Following is a description of the internal logical steps accomplished by that tool. Initially, a sorted and comprehensive Transaction Data Base (XDB) is assumed to be available. After first updating the Enterprise File (EPRISE) with dividend information, module PASS1 executes the first complete pass through XDB assuming all offers to delegate in excess of the delegatee-specified minimums are consummated. At this point, the serial XDB file may be very large. PASS1 reads the serial XDB and the random access Delegate Order File (DORF), which is typically much smaller than XDB, by calling XBLOCK, which in turn invokes modules ORDERS and PRICE, to generate an initial approximation of asset prices. In the process, PASS1 generates a new copy of XDB containing ACQUIRE transactions allocating portfolio earnings based on any REINVEST transaction or default.

In a second pass, module PASS2 uses those approximate prices to value portfolio assets. Asset valuations are used to approximate the total amount of offers to lend to each entity, by maturity and interest rate. This information is made available to potential large borrowers to provide them with a brief opportunity to update their bids to borrow money, as expressed in appropriate ACQUIRE transactions. These transaction updates are input to XACT to update the XDB. This does not necessitate a full pass through XDB, but only those tapes containing transaction data for potential large borrowers, i.e., governments, and perhaps financial institutions or enterprises, as discussed above. The second pass asset valuations are also used to create a Delegation Offer File (DOFF) of all offers to delegate. Module DELCOMP sorts DOFF and then calculates the two compensation thresholds for each delegatee by asset amount and earnings in accordance with the embedded marketplace for investment authority.

Module PASS3 uses the delegatee compensation thresholds to determine which delegation offers are actually consummated, and generates a second approximation of asset prices.

During the fourth pass, PASS4 uses the second approximation prices to determine whether to use a price-dependent ACQUIRE transaction or an available alternative specified in an immediately following ELSE transaction. Since the second pass prices were still approximations, the price dependencies of ACQUIRE transactions must also be understood as being approximate. The prices generated upon completion of this third pass are final prices "as of" the investment cycle date.

Module PASS5 conducts a fifth and last pass to execute transactions as appropriate, update portfolio valuations, and create a Disposition File (DF) containing records of assets to be dispensed by custodial financial institutions.

The Disposition File (DF) is input to module DISPOSE which sorts it and outputs a tape/diskette and/or report of the appropriate records for transmission to each financial institution. Each financial institution in turn notifies the individuals or organizations entitled to the proceeds of consummated transactions, and makes funds available as scheduled, either as a principal or as an agent of the government, depending upon its category.

It should be noted that the above description is based on an investment cycle, rather than continuous order matching.

This is to permit the tool to be operated using minimal computer, communications and financial intermediary infrastructure when privatization is first begun, without sacrificing any significant features of a fully developed market resolution system. However, this tool can also be used as a real-time market system by reducing the period of the investment cycle from months, weeks or days to a brief interval defined by a sufficient number of newly-submitted transactions to ensure sufficiently well-behaved characteristics of the pricing behavior of a sufficient subset of the support assets.

The batch mode investment cycle is adapted to a real-time system in a straightforward manner. The generation of the sorted and comprehensive Transaction Data Base XDB using transported physical media and off-line terminal entry described in FIG. 5 is replaced with real-time transaction entry into an electronic network which channels the submitted transactions to a central computer. The electronic network may be implemented hierarchically, with each level in the network consolidating inputs into smaller numbers of outputs, finally producing a transaction file on the central computer. It is possible to use the Simulate command of the PRIVATIZATION PLANNER™ (a system to help plan for privatization) tool implemented on an electronic network with appropriate security precautions to provide an input interface into even an actual, rather than simulated PRIVATIZE!™ (a new system to achieve universal privatization) system.

The central processing is then expedited for real-time responsiveness by: 1) sequestering modules such as AUCTION and EVOTE which have no inherent need to participate in a real-time market, even though they too can be more useful being implemented as part of a responsive electronic network; 2) deferring, as appropriate, relatively time-insensitive transactions such as BANK, DELEGATE, DIVIDEND, GRADE, JOIN, LEAVE, OVERSIGHT, PERCENTAGE, REINVEST, TRANSFER, WHEN, for example to off-hours processing on a daily cycle; 3) aggregating the assets under delegated investment authority into a composite synthetic portfolio for each delegate-organization, able to be partially or completely segregated into individual portfolio-owner accounts either periodically or as needed; 4) relocating information storage to speed access by taking advantage of the smaller absolute quantities of data being processed over shorter intervals, for example relocating the Transaction Data Base XDB from high capacity tape to disk, and relocating files such as PRICES and ORDERS from disk to main memory, along with periodic archival of such files to higher-capacity media; 5) configuring a powerful real-time central computer or set of computers, and in addition optionally exploiting parallelism inherent in the task, such as transaction front-end preprocessing, asynchronous period-sampling as described below, or any element of first-approximation independence of separate asset prices—for example one processor could be the initial co-recipient of all transactions involving government debt, along with the one or more processors designated as the initial recipient of one or more other assets involved in the exchange; and 6) in addition, the amount of processing power required to achieve convergence of price estimates is reduced because the initial price estimates, which are set equal to the most recent prices, will normally be closer to final price estimates over shorter intervals. The above-mentioned modules are described in detail below.

Successful convergence is determined by analyzing the pattern of final asset price estimates over a sequence of sampling periods which each start at the end of the previous investment cycle but successively add an additional very small interval measured either in time or quantity of newly-arrived transactions, as adaptively optimized, but at least equal to the amount of time needed to complete the process of price estimation for the previous period unless parallel processor with shared information asynchronously sample cumulated transactions.

The price estimate for an asset converges sufficiently when the deviation between the previous price and the price estimate for the first sampling period, or between the price estimates for a number of successive sampling periods, is within acceptable bounds based upon recent experience with that asset. A new investment cycle is closed when a sufficient number of asset prices converge. Transactions involving only assets whose price estimates have converged are executed, being consummated if their price conditions are met, and being retained for inclusion in future cycles if not—unlike the default operation in batchmode operation, described above. Transactions involving assets whose prices have not converged are retained for inclusion in future cycles. Transactions involving only assets whose price estimates have converged in the above sense include ACQUIRE transactions, even if an associated ELSE transaction refers to nonconverged assets, but exclude ELSE transactions if an associated ACQUIRE transaction refers to nonconverged assets.

Transactions entered into the real-time system can incorporate a field containing a "good 'til canceled" (GTC) flag or a "good until" time which specifies the time at which the transaction is to be cancelled, with the default normally being cancellation at the end of a normal daily market cycle. It is also possible for transactions entered into the real-time system to incorporate a "stop price" which triggers the transaction to be executed "at the market" at any available price. However, the expected best method of implementation, at least in markets without sufficient liquidity, is to not allow "stop" orders or "market" orders, but rather to require each price order to have a "limit price" which must be at least satisfied before the transaction is consummated. Note that like in real-time mode, batch mode regulations may constrain the usage of "market orders" or constrain prices by setting "price limits" over time intervals beyond which transactions are not allowed to be consummated.

The system promotes the liquidity needed for a successful real-time system. Owners of portfolios have access to an effective tool to continuously bid and offer assets as desired. The government or individual enterprise can continuously offer debt or indexed debt, adjusting the offered price, i.e., the interest rate, and offered quantity as desired. The government and approved financial institutions can continuously offer annuities, also adjusting the offered price, i.e., the implicit interest rate, and offered quantity as desired. The government can post standing offers of blocks of shares of enterprises in which it wants to increase private holdings at prices it is able to continuously adjust, and can place standing bids for enterprise shares if it chooses to support those share prices or buy back shares at price levels it considered unrealistically low in a market sense or unacceptably low in a policy sense. Enterprises are able to market blocks of their shares to the public, to bid for blocks of their shares, for example in a "going private" process or as part of corporate finance strategy, or to engage in trading in other enterprise shares as allowed by any governing regulations. Enterprises may offer new shares intended to raise capital, or may offer with government approval shares held by the state.

Delegatee-organizations are able to function anywhere on the temporal investment spectrum consistent with their representations to the public in their disclosure documentation, including position trading, day trading and scalping. Since delegatee-organizations will be highly motivated to maximize either their total investment return or their assets under management, there are strong incentives form them to find, exploit and in the process reduce inefficiencies in price discovery among the various assets on the system, including SMUs and individual enterprise stocks. In addition, it is possible for the government to encourage market-makers pledged to enhance liquidity in specific assets by various incentives, such as favorable tax treatment of income, or delegations of possibly large blocks of government assets including the particular sets for which the market-maker has assumed some responsibility, conditioned upon their performance in achieving objectives such as helping stabilize price trajectories or marketing state-owned assets to private investors.

Even individual portfolio owners with access to an effective electronic network will be able to submit real-time transactions. For example, if the French government vested parts of large state enterprises in the entire citizenry, individual citizens could assess the PRIVATIZE!™ (a new system to achieve universal privatization) tool through a network like Minitel.

This promotion of liquidity by the system not only improves the prospects for a successful real-time marketplace, but also improves the character of the marketplace in batch mode. In fact, the two modes are not inconsistent. The real-time mode provides a very broad and virtuously continuous investment opportunity set to a set of sophisticated market participants, even relative to modern market economies, and the batch mode provides periodic low cost access to the marketplace to a broad cross-section of citizens with a typically longer investment horizon.

A more detailed description of the set of files, modules, transaction commands and assets of an embodiment of the PRIVATIZE!™ (a new system to achieve universal privatization) computerized tool follows.

Disposition File

The serial Disposition File (DF) contains financial records to be transmitted to financial institutions which will act as custodians of the specified assets. It is created by module PASS5 and processed by module DISPOSE.

Format financial institution ID code:recipient ID code:
recipient name:address:phone:supplementary name:
asset1:amount1: . . . asset n:amount n Examples

51100100FNMXYFNBR:19460630ERFXYCDEF:

Ellen Right:1040 Oak Terace;Anywhere:555-1515:Smith:

PAYOUT;FNBR;940101;D;N;M;4.32%;1;985:250,000

(Financial institution FNBR is custodian of an annuity for individual ER, in the amount of 985 (local currency) to be paid monthly until her death, without right of survivorship. This amount was calculated from actuarial table #1, assuming an implicit interest rate of 4.32% and an initial investment of 250,000 (local currency).)

51100021MLMMLPF:19630704MRMXYBCDE:

Michael Right:1040 Oak Terrace;Anywhere:555-1515:Tern:

STLI:1000:SMU:1:DLEVR;01;8%:10,000

(Financial institution MLPF is custodian, on behalf of individual MR, of 1000 shares of STLI, 1 SMU and 10,000 (local currency) of 8% debt of LEVR which matures in the year 2001.)

Certain assets such as debt and annuities (DXXXX, DIXXXX and PAYOUT) are automatically included in the Disposition File if the acronym embedded in the asset does not specify the government itself.

Other assets, such as Stock Market Units, enterprise stock, foreign currency (SMUs, EXXXX, FCXX) or government debt are included in the Disposition File only when so directed by a valid TRANSFER command.

Note

The asset amount must be in number of shares, number of SMUs, units of foreign currency, face value of debt (in local currency) or periodic annuity payments (in local currency). The asset amount cannot be expressed as a percentage of the portfolio contents.

DFXXXX

Disposition File: Excerpts

The serial Disposition File: Excerpts (DFXXXX) is generated by module DISPOSE and contains the information to be transmitted to a particular custodial financial institution.

Format

Financial institution ID code:name:address:phone:supplementary name

Recipient #1 ID code:name:address:phone:supplementary name:
asset1:amount1: . . . :asset n:amount n

.

.

.

Recipient #N ID code:name:address:phone:supplementary name:
asset1:amount1: . . . :asset n:amount n

DOFF

Delegation Offer File

The serial Delegation Offer File (DOFF) contains a summary of all offers to delegate investment authority over assets. It is created by module PSS2, and then used by module DELCOMP to 1: calculate the minimum delegatee compensation thresholds, and 2: update file DORF with that information.

Record Format delegatee acronym:asset value:compensation offer::

Examples

INVI:10,000:10%E::

(There was an offer to delegatee INVI to accept investment authority over 10,000 (local currency) worth of assets (valued on the basis of price estimate #1 as generated by module PASS1), in return for 10% of subsequent earnings.)

INVI:100,000:0.5%A::

(In this case, the delegation offer is for 0.5% of assets estimated to be worth 100,000 (local currency).)

DORF

Delegatee Order File

The random access Delegatee Order File (DORF) contains, for each delegatee, its nonproprietary transactions and its minimum compensation threshold by assets and earnings, It is created by module DORFGEN (which precedes PASS1 and posts nonproprietary orders), and then updated by module DELCOMP (which follows PASS2 and posts minimum compensation thresholds). It is used by modules PASS1, PASS3, PASS4 and PASS5 to determine what transactions the delegatees direct for assets in various portfolios.

Record Format (Standard XDB Format)

transaction type;date entered:as of date:field 1: . . . :field N::

The only transaction types posted are ACQUIRE, CANCEL, FILTER, INDENT, PERCENTAGE, REINVEST and WHEN. No proprietary transactions (relating to the delegatee's own assets) are posted. Room is reserved at the end for DELCOMP to update it with a PERCENTAGE record incorporating the final minimum compensation.

EPRISE

Enterprise File

The random access Enterprise File (EPRISE) for a particular investment cycle contains, for each enterprise, its ID code (with embedded acronym), the number of shares held on the PRIVATIZE!™ (a new system to achieve universal privatization) system, and the dividend to be accrued per share and pricing information for the stock and any debt instruments. It is updated by module PASS1, which first scans the segment of the Transaction Data Base (XDB) containing enterprise transaction blocks to update EPRISE with information from DIVIDEND transactions. EPRISE is also updated by module PASS5, which posts any corrections to the numbers of shares resulting either from TRANSFER transactions (resulting in decreases due to transmittals to a custodial financial institution) or from "ACQUIRE for assets received (VAL)" transactions (resulting in increases due to share issuance). Finally, during each of PASS1, PASS3 and PASS4, module PRICING updates EPRISE with the latest calculations of asset prices.

File Format

SMU label: # SMUs: total dividend::

First SMU enterprise ID code: # shares: dividend:

stock price estimate #1:price estimate #2:final price:

debt instrument #1:price estimate#1:price estimate #2:final price:

...

debt instrument #N:price estimate #1:price estimate #2:final price::

.

. . .

.

Last SMU enterprise ID code: # shares: dividend: . . .

SMU2 label: # SMU2s: total dividend::

First SMU2 enterprise ID code: # shares: dividend: . . .

. . .

Last SMU2 enterprise ID code: # shares: dividend: . . .

UNSMU label: total # shares: dividend::

First UNSMU enterprise ID code: # shares: dividend: . .

.

. . .

Last UNSMU enterprise ID code: # shares: dividend: . .

.

Notes

1. While SMU2s can be created immediately, the list of identified SMU2 enterprises would remain empty until after the first privatization occuring after the date cut-off separating SMUs and SMU2s.
2. "UNSMU" enterprises are those not included in either SMUs or SMU2s. They can arise either from private formation de novo, or by taking a SMU or SMU2 enterprise private by making a tender offer for all shares. Such a tender offer would be feasible even for an enterprise held by the entire citizenry as part of their SMUs, by means of polling techniques implemented by module EVOTE. If the tender offer were successful, it could be implemented by executing a DIVIDEND transaction corresponding to the total buyout price for shares remaining on the PRIVATIZE!™ (a new system to achieve universal privatization) system.
3. It is possible to create a new UNSMU asset comprised of qualifying enterprises on the system as of a fixed date. Until the, "UNSMU" is an acronym rather than an asset, and the total number of shares in the UNSMU record represents the sum of shares in all UNSMU enterprises, rather than the number of UNSMU stock "baskets."
4. In the context of the EPRISE file, the term "enterprise" includes tradeable-stock-based or debt-issuing organizations such as financial institutions.
5. The price for an enterprise may be in the form "lower bound; upper bound" it the arbitrage between SMUs and synthetic bids and offers leaves a price gap between the highest bid and lowest offer executed for shares in that enterprise.

ORDERS

Order File

This serial file contains a set of all the orders to sell one asset and buy another which are to be used by module PRICING to calculate asset prices.

Format: ID code #1::

asset1:price1:asset2:amount2::

. . .

asset1:price1:asset2:amount2::

ID code #N:: asset1:price1:asset2:price2:amount2::

. . .

asset1:price1:asset2:price2:amount2::

Copies of this file are created by modules PASS1, PASS3 and PASS4 using Transaction Data Block (XDB) information processed by module XBLOCK. Module PRICING is then invoked to process ORDERS to calculate asset prices.

PRICES

Asset Price File

The random access Asset Price File (PRICES) contains price estimates and the final price for Stock Market Units (SMUs), foreign currency (FCDM and FCUS), debt of the government (e.g., DLEVR, DILEVR and PAYOUT;LEVR . . . ). It is crated and updated by module PRICING.

Format

Investment cycle #1 price estimate #1

SMU, SMU2(null), FCDM, FCUS government debt instrument #1 . . . #n

Investment cycle #1 price estimate #2
SMU, SMU2(null), FCDM, FCUS
government debt instrument #1 . . . #n Investment cycle #1 final prices
SMU, SMU2(null), FCDM, FCUS
government debt instrument #1 . . . #n

XDB

Transaction Data Base

The serial Transaction Data Base (XDB) is the central file of the PRIVATIZE!™ (a new system to achieve universal privatization) system. It contains transaction blocks comprised of transaction records associated with a single ID code. An ID record beings a transaction block, which continues up to a "new line" character or the end of file.

File Format
First Transaction Block
　ID record ot1her transaction records "new line" character
Second Transaction Block
　ID record other transaction records "new line" character
Final Transaction Block
　ID record other transaction records End of file
Transaction Record Format
　transaction type:date entered:as of date:field 1: . . . :field N::
Field Format
　subfield 1; . . . ;subfield n Thus, transaction blocks are delimited by ID records and a "new line" character or end of file mark, transaction records are delimited by two contiguous colons "::", fields are delimited by a single colon ":", and subfields are delimited by a semicolon ";". There are no other delimiters.

The Transaction Data Base is generated by module XACT. XACT allows input of any valid transaction records from any source (as legitimated by off-line procedures), including terminals or serial devices such as floppy disks or 8 mm tape drives.

In the early stages of the update cycle of the Transaction Data Base, new transaction data can be viewed as compartmentalized into "logical subfiles" depending on their source, e.g.: ADB (Auction Data Base), CDB (Citizen Data Base), CHIDB (Charitable Institution Data Base), EDB (Enterprise Data Base), FIDB (Financial Institution Data Base), FORNDB (Foreign Investor Data Base), GDB (Government Data Base as subdivided by agency, e.g. PBDB Privatization Board Data Base), TDB (Testamentary Data Base). While this "logical compartmentalization" can be useful in facilitating input procedures, audit trail backups and ancillary processing applications making additional use of the data, it is nonetheless completely transparent to the PRIVATIZE!™ (a new system to achieve universal privatization) software.

Module XACT maximally aggregates dispersed records for the same ID code into a single transaction block, and sorts the resulting transaction blocks, within the constraints of available memory and disk space. After an interative sort procedure, the final result is a single, comprehensive, sorted XDB file. The final XDB file would typically be comprised of a series of 8 mm tapes (or other high capacity storage media).

The comprehensive, sorted Transaction Data Base (XDB) is the basic file with PRIVATIZE!™ (a new system to achieve universal privatization) processes (in five passes) in order to: 1. determine delegations of investment authority; 2. establish asset prices; 3. execute orders as appropriate; 4. update portfolio valuations; and 5. generate the Disposition File for transmittal to custodial financial institutions.

Note

The default numeric protocol is that a period "." denotes the decimal point and a comma "," is ignored as merely a devise to format large numbers.

This default can be overriden by editing Included Module—GLOPARM. For example, by editing module GLOPARM as follows:
　decpt=','
　numfmt='.'
the defaults would be switched.

Software Module ACTUARY

ACTUARY calculates periodic annuity payments.
Input
　ID-code, interest rate, amount invested and PAYOUT subfields: begin; end; survive; frequency;implicit interest rate;actuarial table #.
Return
　Amount of periodic payments, for posting to the last PAYOUT subfield.
Processing Logistics
Called internally by PASS5.
Module Logic
From the ID code and PAYOUT subfield "begin", ACTUARY determines the number of years (including fractional part) in the future of the first payment. The present value of a first payment of 1 is then calculated from the implicit interest rate. That present value is attenuated by the probability of survival according to the specified actuarial table if the ID code specifies an individual and the PAYOUT survive subfield was not set to S. The probability of survival is calculated from male and female lists of year-to-year survival probabilities. (Note that if survival probabilities are differentiated by sex, where females tend to be longer-lived their annuity payments would be smaller, magnifying any gender gap where females tend to have lower incomes. On the other hand, failing to distinguish between the sexes by using the same values in the male and female survival probability lists could reduce the incentive for males to invest in annuities.)

The present value of subsequent payments, until the end date or until the probability of survival becomes negligible, are progressively included into a cumulative present value. Finally, the amount of the periodic payments is calculated by dividing that cumulative present value (associated with periodic payments of 1) into the amount invested.

Software Module AUCTION

AUCTION supports the immediate bidding with citizens' Stock Market Units (SMUs) for state property such as shops, flats, land or equipment.
Input
　Serial file: Sorted Transaction Data Base (XDB), or a subset of it.
Output Report
　List of individuals attempting to transfer away a total of more than 1 SMU, the total attempted transfer amount, and optionally the entire transaction block for those individuals.

Typical Usage

A local governmental entity applies module AUCTION to all transaction data in its possession after determining successful bidders at auctions or other transfers of state property other than large state enterprises, such as shops, flats, land or equipment.

If there is an initial transferable allocation of 1 SMU to each citizen, a warning is reported if attempted cumulative transfers exceed 1. Note that after the first investment cycle, if a portfolio owner had acquired additional SMUs, the warning may prove to be a false alarm. Conversely, if not all SMU-transfer-transaction data (such as from other successful small state enterprise auction bids) is available to the local government, AUCTION could fail to warn of a potential over-transfer (which could result in restitution to the government of the acquired asset plus profits).

Module Logic

Invoke submodule XBLOCK to evaluate the transaction block, suppressing invocation of the Delegatee Order File (DORF) and forcing the inclusion of all price-contingent transfers away of SMUs. Trigger reporting if cumulative transfer away of SMUs exceeds 1.

Software Module DELCOMP (Delegatee Compensation)

DELCOMP calculates the minimum thresholds of delegatee compensation as a percentage of assets and earnings.

Input

Serial file: Delegation Offer File (DOFF)

Serial file: Transaction Data Base (XDB)

Output

Random access file (updated): Delegatee Order File (DORF)

Typical Usage

DELCOMP is run after PASS2 has created the delegation Offer File (DOFF). The delegatee compensation thresholds posted to the Delegatee Order File (DORF) are subsequently used in PASS3 to establish final delegations.

Module Logic

The Delegation Offer File (DOFF) is sorted by delegatee and by compensation offer. The transaction block for each delegatee is read into memory, along with the compensation offers from DOFF. Using the PERCENTAGE command specifications of the maximum amount of assets under discretion (as constrained by applicable law or regulation) and the percentage of assets to be selected on the basis of compensation by earnings, determine maximum asset amounts by earnings and assets. For each of those two categories, step down the sorted compensation offers (starting at the highest), cumulating offered amounts, until the maximum amount or the minimum price (from the PERCENTAGE command again) is reached. The compensation threshold is set to the compensation offer at that point.

Software Module DISPOSE

DISPOSE prepares a Disposition Report and appropriately excerpts from the Disposition File (DF) for transmittal to custodial financial institutions.

Input

Serial file: Disposition File (DF)

Serial file: Transaction Data Base (XDB)

Output

Report: Disposition Report

Serial file: Disposition File: Excerpts (DFXXXX)

Typical Usage

DISPOSE is run after PASS5 has generated the Disposition File. The Disposition File: Excerpts, along with a corresponding Disposition Reports (if appropriate), is then transmitted to each custodial financial institution.

Module Logic

DISPOSE first sorts the Disposition File by financial institution and subsorts by recipient ID. It then generates the Disposition File: excerpt and any appropriate Disposition Report for each custodial institution after obtaining its ID record (containing address information) from XDB.

Software Module DORFGEN (DORF File Generator)

DORFGEN generates the random access Delegatee Order File (DORF) using information from the Transaction Data Base (XDB).

Input

Serial file: Transaction Data Base (XDB)

Output

Random access file: Delegatee Order File (DORF)

Module Logic

Read the delegatee-organization section of XDB, and post to random-access DORF non-proprietary transactions of types: ACQUIRE, CANCEL, FILTER, IDENT, PERCENTAGE, REINVEST and WHEN.

Reserve room at the end of the posted transaction block for a PERCENTAGE record incorporating the final minimum compensation, to be posted by module DELCOMP.

Generate access-keys based on delegatee-organization acronym for subsequent random access.

Software Module EGEN (Enterprise File Generation)

EGEN generates and updates file the Enterprise File (EPRISE) with ID codes of all enterprises, distinguishing among SMU, SMU2 and UNSMU enterprises in the process.

Input

Interactive date entry: Enterprise IDs and SMU category.

Output

Random access file: Enterprise File (EPRISE)

Module Logic

Determine whether the EPRISE file exists yet. If not, prompt for the ID codes of all enterprises falling in the SMU, SMU2 (presumably none) and UNSMU categories respectively. Sort the enterprises by acronym and create EPRISE.

If EPRISE already exists, upon request display current enterprises and allow deletion or addition of specific enterprises.

Note

When SMU enterprises "spin off" subsidiaries (e.g., to achieve demonopolization goals), then the government agency maintaining the EPRISE file by means of module EGEN must insert the new spin-offs as SMU enterprises. If the restructuring is material to the original enterprise, any "surviving core" should also be treated as a new enterprise to avoid masking the discontinuity.

Software Module EVOTE (Enterprise Vote)

EVOTE uses polling techniques to support enterprise shareholder votes in the context of extremely widespread share ownership.

Input

For one or more enterprises: enterprise acronym, number of shares outstanding, threshold percentage ownership, requested number of names below threshold: N, output mode (mailing list or properly addressed copy of the decision to be voted on) and (if second output mode) text of decision to be voted on.

Output

By enterprise, names and addresses of all large and N small shareholders and their percentage and number of shares, with a selection probability for small shareholders an increasing function of ownership percentage, either as mailing lists or mail-ready voting packets.

Module Logic

Perform an initial scan on the Transaction Data Base (XDB) for large owners (i.e., above the threshold percentage) of the specified enterprises. Note that the set of tapes in the XDB series (which is sorted by ID code, including birth date for individuals) corresponding to citizens below a statutory minimum for voting in enterprise decisions can be omitted. For each ID code, invoke module XBLOCK to determine the quantities of each asset. For each enterprise in the input list, calculate the percentage ownership reflected in this transaction block. If it exceeds the threshold, "select" the ID code and cumulate its shares into "large shareholder total holdings." (In practice, depending on the threshold percentages, the initial large shareholder scan may be restricted to the sorted XDB tapes containing transaction data for governmental entities and organizations.)

Next, scan XDB for owners of percentages below the threshold. "Selection" in this case is made by a Monte Carlo technique, using a probability of:

$$\text{Selection probability} = 1 - (1-p)^s;$$

where S is the number of shares in the portfolio, and p is the selection probability for a single share as follows:

$$p = \frac{\mu(N)}{(\text{small shareholder total holdings})};$$

where (small shareholder total holdings) equals (total shares outstanding) minus (large shareholder total holdings), N is the requested number of small shareholder names, and $\mu(N)$ is an array of values determined by the Poisson approximation of the binomial distribution as follows:

$$.5 = \int_0^N \frac{e^{-\mu} \mu^x}{x!} dx$$

This method of calculating selection probability of a small shareholder portfolio will yield approximately N small shareholder names (with a 50/50 probability of yielding either more or less).

"Selection" results in either the addition of the name, address and number and percentage of shares to a mailing list (partitioned into large and small shareholders), or else the automatic generation of a properly addressed set of all the voting decisions to be put to a particular individual or organization.

Notes

1. If a particular individual or organization exceeds the threshold in at least one case, and is also "selected" as a small shareholder in another enterprise, two separately addressed mailings could be generated.
2. The output option of sorted mailing lists requires sufficient random access file space to retain all selected names and addresses. However, this capability can also include sorting by an address subfield (such as a zip code) or by the regional center initially registering the ID code (as a surrogate for the region of the current address) in order to expedite the mailing process.
3. For this service, each enterprise might be charged a fixed fee, plus a per-name fee based upon whether the program generates a mailing list or the actual mail. The threshold percentage ownership and the number of names requested would presumably be a function of the importance of the decision, perhaps with statutory minimums.
4. Since EVOTE deals only with share ownership recognized by the PRIVATIZE!™ (a new system to achieve universal privatization) system, any shareholdings transmitted to financial institutions by TRANSFER transactions would have to be polled independently.
5. Where a "selected" individual or organization has validly delegated voting authority over at least some of its shares in the enterprise, separate selection probabilities are calculated by appropriately allocating portfolio shares between the portfolio owner and each organization to which it has delegated voting authority.

Software Module PASS1

PASS1 updates the Enterprise File (EPRISE) with information from current DIVIDEND transactions. PASS1 also estimates asset prices assuming all delegation offers above delegatee-specified minimums are consummated. In the process, it creates an updated Transaction Data Base (XDB) file containing reinvestment transactions based on portfolio earnings.

Input

Serial file: Transaction Data Base (XDB)
Random access file: Delegatee Order File (DORF)

Output

Random access file: EPRISE (updated with current dividends)
Random access file: PRICES (updated with price estimate #1)
Serial file: Transaction Data Base (XDB) (new copy)
Serial file: ORDERS (also used a subsequent input)

Module Logic

First scan the segment of XDB containing enterprise transaction blocks to update EPRISE with information from DIVIDEND transactions, cumulating the dividends to totals for SMUs, SMU2s or UNSMUs as appropriate.

Then process XDB (using module XBLOCK with the switch set to enable usage of file DORF), generate the ORDERS file for later use by PRICING, and create an update of XDB containing reinvestment transactions. These are formulated by cumulating portfolio earnings from equities (SMUs, SMU2s or enterprise holding), government debt (i.e., not automatically posted to the Disposition File—DF) and foreign currency.

The cumulated earnings are then allocated to assets (via ACQUIRE transactions at prevailing prices) in accordance with any applicable REINVEST transaction or default.

PASS1 then invokes module PRICING which uses the ORDER file to generate price estimate #1. Finally, PASS1 posts this estimate to file PRICES.

Software Module PASS2

PASS2 estimates asset values using price estimate #1 to value delegation offers and lending offers.

Input
Serial file: Transaction Data Base (XDB)
Random access file: PRICES
Output
Serial File: Delegation Offer File (DOFF)
Module Logic
Read a transaction block from XDB and call routine XBLOCK. Aggregate in memory offers to lend to potentially large borrowers, and upon completion generate a lending report for the borrowers' evaluation.
After processing each transaction block, post delegation offers to file DOFF.

Software Module PASS3

PASS3 generates price estimate #2 using the final delegations posted by module DELCOMP to the Delegation Order File (DORF).

Input
Serial file: Transaction Data Base (XDB)
Random access file: Delegatee Order File (DORF)
Random access file: PRICES
Output
Random access file: PRICES (update with price estimate #2)
Serial file: ORDERS (also used as subsequent input)
Module Logic
Process XDB by invoking module XBLOCK and posting the returned array of orders to the ORDER file. Then invoke module PRICING which uses the ORDER file to generate price estimate #2. Finally, PASS3 posts this estimate to file PRICES.

Software Module PASS4

PASS4 uses price estimate #2 generated by PASS3 to decide whether to invoke ELSE transactions, and then calculates final asset prices.

Input
Serial file: Transaction Data Base (XDB)
Random access file: Delegatee Order File (DORF)
Random access file: PRICES
Output
Random access file: PRICES (updated with final prices)
Module logic:
Same as PASS3, except XBLOCK will return an order array which reflects price estimate #2 determining whether or not to invoke individual ELSE transactions.

Software Module PASS5

PASS5 uses the final asset prices generated by PASS4 to execute transactions, create an update Transaction Data Base (XDB) and generate the Disposition File (DF).
Input:
Serial file: Transaction Data Base (XDB)
Random access file: Delegatee Order File (DORF)
Random access file: PRICES
Output:
Serial file: Transaction Data Base (XDB) (new copy)
Serial file: Disposition File (DF)
Module logic:
PASS5 uses the same logic as PASS3 and PASS4, except that it makes use of final asset prices.
During processing of XDB, PASS5 also creates an updated version by:
1. inserting the final interest rate (price) as the last subfield in each debt instrument (DXXXX, DIXXXX);
2. inserting the final implicit interest rate (price), actuarial table # and periodic payment amounts (determined by invoking module ACTUARY) as the last three subfields in each annuity instrument (PAYOUT);
3. suffixing to each potentially price-dependent transaction (i.e., ACQUIRE, ELSE and DELEGATE) another record documenting whether it was executed, either yes: "Y:investment cycle #::" or no: "X:investment cycle #::";
4. calculating actual delegatee compensation and transfering a portion of the delegated portfolio to the delegatee's account, either as a fixed percentage (if compensation was based on assets) or a percentage based on calculated total return (if compensation was based on "earnings"); and
5. appending to each transaction block in the new XDB a summary record of the amounts of assets currently contained in the portfolio, along with a total valuation, as follows:

Z:asset 1:amount 1: . . . :asset n:amount n:total valuation::

Finally, PASS5 generates the Disposition File (DF) by posting in the following format:

Recipient ID code:name:address:phone:supplementary name: asset 1:amount 1: . . . :asset n:amount n::

information which module DISPOSE will process for transmittal to custodial financial institutions.

Software Module PRICING

PRICING creates or updates file PRICES and updates file EPRISE. These files contain price estimates #1 and #2 and the final prices for assets in a given investment cycle.
Input:
Random access file: PRICES
Random access file: Enterprise File (EPRISE)
Serial file: ORDERS
Output:
Random access file: PRICES
Random access file: Enterprise File (EPRISE)
Serial file: ORDERS (sorted version)
Module logic:
PRICING iteratively calculates the "market-clearing" price for each asset which satisfies the largest quantity of bids and offers. In the case of an asset with a single offeror (or bidder) such as PAYOUT, DXXXX and DIXXXX, that offeror (in these cases) establishes the price and the execution quantity is the amount of bids at or above that price.

In the case of assets with multiple bidders and offerors, at the "market-clearing" price the amount of bids at or above it is equal to the amount of offers at or below it. PRICING finds this price by first calculating a complete cumulative offer-amount array (starting at the lowest offer and working upward), and then calculating the corresponding cumulative bid-amount array (starting at the highest bid and working downward) until the cumulative bid-amount equals or exceeds the cumulative offer-amount.

In the case of transactions involving cross-prices, where a price-contingent bid uses the proceeds of a price-contingent offer, the bid amount will be a function of the market price obtained for the offered asset.

In particular, if agent-i bids $p_{ij}$ for instrument-j, using the proceeds from offering amount-$q_{ijk}$ of instrument-k at price-$p_{ik}$, and if the market prices are correspondingly $P_j$ and $P_k$, this is equivalent to the following bid for instrument-j:

$$\text{amount} - j = q_{ijk}\frac{P_k}{P_j},$$

$$\text{if } \frac{P_j}{P_k} \leq \frac{p_{ij}}{p_{ik}};$$

and a corresponding offer for instrument-k:

$$\text{amount} - k = q_{ijk};$$

$$\text{if } \frac{P_k}{P_j} \geq \frac{p_{ik}}{p_{ij}}.$$

If at least one of the two price contingencies is an interest rate, then the cross-price constraint is broken out into its component constraints which must be independently satisfied:

$$P_j \leq p_{ij}, \text{ and } P_k \geq p_{ik}.$$

If the bid-for instrument has no price contingency (i.e., the price in the corresponding ACQUIRE transaction equals 0), then set:

$$p_{ij} = \text{MIN(default maximum price, } P_j).$$

If the offered instrument has no price contingency, then set:

$$p_{ik} = \text{MAX(default minimum price, } P_k).$$

The default maximum and minimum prices are designed to be reasonable constraints, and are set at a particular percentile along the spectrum of price-dependent bids and offers respectively.

Applying these principles to the assets in the PRIVATIZE!™ (a new system to achieve universal privatization) system, PRICING first reads the ORDERS file and sorts it by asset kind and price contingency. It then obtains the latest market price estimates from files PRICES and EPRISE. Estimates of prices for the single-offeror assets (DXXXX, DIXXXX and PAYOUT) are calculated. Then prices are estimated for foreign currency assets (FCDM and FCUS) assuming cross-price contingencies and multiple bidders and offerors.

At this point, the price of a SMU is calculated assuming cross-price contingencies and multiple bidders and offerors. In addition, arbitrage is automatically performed between SMUs and the component enterprise shares. When calculating the cumulative offer-amount array for SMUs (starting at the lowest SMU offer and working upward), the lowest offers for enterprise shares which make up a SMU are aggregated if they represent a complete set, and treated as "synthetic" but legitimate SMU offers. The execution of synthetic offers increases the amount of actual SMUs by transforming a complete set of enterprise shares into SMUs.

The cumulative bid-amount array for SMUs (starting at the highest SMU bid and working downward) is likewise augmented by synthetic SMU bids composed of the aggregation of the highest bids for enterprise shares which make up a SMU. In this case, a complete set of bids is unnecessary, and any unbid-for enterprise shares (or bid at less than a statutory minimum designed to prevent private parties from "vacuuming up" large quantities of shares at de minimis prices) in executed synthetic SMU bids are allocated to a government account. In effect, by operating the system, the government automatically reaps the rewards of arbitrage between SMUs and enterprise shares.

After determining the price of a SMU, prices are calculated for shares in individual enterprises. This again proceeds on the assumption of cross-price contingencies and multiple bidders and offerors. However, the amount of shares allocated to executed synthetic SMU bids and offers are first subtracted from the cumulative bid-amount and offer-amount arrays respectively.

After an iteration of estimating asset prices, the process is repeated so that bid-amounts which are a function of other asset prices can be approximated more closely. Therefore, using the new asset price estimates, updates estimates are prepared in turn for single-offeror assets (DXXXX, DIXXXX and PAYOUT), foreign currency (FCDM and FCUS), Stock Market Unit (SMU) and enterprise shares (EXXXX). Iterations continue until price estimates sufficiently converge. These prices are then posted to files EPRISE and PRICES.

Notes:

1. Subsequent to the first investment cycle, non-PAYOUT debit in the government (e.g., DLEVR, DILEVR) will be subject to the possibility of multiple offerors and be processed accordingly. This will necessitate adjustments to the face value of debt being liquidated, to take into account changes in net present value due to changes in price (i.e., interest rate).

2. When appropriate, PRICING will use the SMU pricing technique to calculate the price of a SMU2, an UNSMU or industry-specific "sub-baskets" which hierarchically comprise any of those three stock "baskets." Note that hierarchical "sub-baskets" could not only promote efficient capital formation by presenting investment vehicles for emerging industries, but they would also provide the opportunity for additional government arbitrage income.

3. When investors become more experienced, it may be useful to offer the ability to bid or offer at prices equal to an investor-specified percentile along the spectrum of price-dependent bids or offers.

Software Module XACT

XACT generates the Transaction Data Base (XDB).
Input:
  Transaction records from serial device(s).
Output:
  Maximally sorted transaction records to a serial device.
Module Logic:

This module accepts transaction records (from any available device, e.g. terminal, diskette or tape), optionally performing a preliminary validity check. Transaction blocks containing records in error are either directed to an alternate output device for subsequent review and correcting, or else to a terminal operator. The terminal operator could either correct a terminal-entered record, or inject appropriate CANCEL, substitute and NOTE records in the case of an erroneous record entered from another device (in the interest of preserving a complete audit trail).

The transaction records are then posted to an array of transaction blocks in main memory. This array is sorted (by ID code) when full or upon completion, and transferred to a disk file if available. This process is iterated until completion or until no more disk space is available. Then the disk files (if available) are merge-sorted to a serial output device writing to media such as diskettes (each holding about 1 megabyte of data) or 8 mm tapes (each holding up to 5 gigabytes (sic) of data).

XACT processes all possible transactions from all recognized entities. The intermediate product is a set of diskettes or tapes, sorted at an intermediate level (i.e., chunks corresponding to the amount of main memory or disk memory available, whichever was greater, will be sorted "intra-chunk", but without any "inter-chunk" sorting).

In practice, data entry will likely be compartmentalized in the initial stages into what can be considered "logical sub-files", e.g.:

1) Citizen Data Base (CDB), comprising transaction records for individual citizens. This can range from simply the entry of an ID record (which could be coordinated with voter registration or adapted from other governmental data bases, and would correspond to an initial census), to a comprehensive set of transactions to buy or sell different assets or authorize delegation of investment authority.

2) Auction Data Base (ADB), comprising the exchanges of SMUs for OSPs. These transactions would typically result from successful bids at local auctions. The governmental entity arranging the auction, which would presumably obtain a percentage of successful bids, would use module AUCTION to try to ensure that individuals do not transfer more than their allotment (i.e., one) of SMUs (subject to restitution of any OSPs).

3) Testamentary Data Base (TDB), comprising transactions to dispose of the portfolio of a deceased individual. These would typically be generated by appropriate local authorities after processing any will or conducting any "probate."

4) Enterprise Data Base (EDB), Financial Institution Data Base (FIDB), Charitable Institution Data Base (CHIDB), Foreign Investor Data Base (FORNDB), Government Data Base (GDB), Privatization Board Data Base (PBDB) would each likewise comprise transactions submitted by the respective entities.

However, it should be emphasized that these "logical sub-files" are actually just parts of a single Transaction Data Base (XDB), and any "logical distinctions" are transparent to the PRIVATIZE!™ (a new system to achieve universal privatization) software system. Indeed, in its final mode, XACT reads input from multiple devices (such as 8 mm tape drives), repeats the transaction validity check, performs an ID code merge-sort irrespective of the "logical sub-file" source, and outputs to another device (such as an 8 mm tape drive again). By appropriately iterating this process, an incompletely sorted Transaction Data Base (XDB) of even very great size can be sorted completely and effectively.

Notes:

1. A subsequent version (MXACT: Multi-user XACT) will allow multiple users on a single computer to simultaneously input transaction records, again to be sorted in main memory and posted to a user-specific disk file. When the first user-specific disk file is filled, a flag will signal all program copies to close out their current disk files and open alternates to continue processing. This will trigger another program copy to merge-sort the closed disk files to the serial output device. However, this module will likely not be portable between operating systems or even computer lines.

2. The operator can request that XACT automatically flag apparent discrepancies, such as the absence of appropriate transactions to initially transfer SMUs or SMU2s to citizens.

Software Module XBLOCK

XBLOCK analyses a transaction block (i.e., all the transactions for a particular ID code) in the Transaction Data Base (XDB).

Input:
 Parameters: transaction data block for an ID code, and a switch which specifies whether to invoke the Delegate Order File (DORF).
 Global data: Asset prices by investment cycle.
 Random access file: Delegatee Order File (DORF).
Return:
 1. Number of kinds of assets ever in the portfolio, total portfolio valuation.
 2. An asset array containing: asset kind, cumulative transfers, current asset quantity, asset price, asset value. The array is sorted by last date the asset was contained in the portfolio, and subsorted by asset value.
 3. An array of orders to input to module PRICING: (asset1,price1,asset2,price2,amount2).
Processing Logistics:
 Called internally by software modules as necessary (e.g., AUCTION, PASS1–5).

Software Included Module—GLOPARM (Global Parameters)

Policy choices (noncomprehensive)
 compmna: compensation minimum as % of assets.
 compmne: compensation minimum as % of earnings.
 compmxa: compensation maximum as % of assets.
 compmxe: compensation maximum as % of earnings.
 maxfilt: maximum number of simultaneously operative filters.
Technical specifications (noncomprhensive)
 bdlim: block delimiter "newline character".
 decpt: decimal point ".".
 fdlim: filed delimiter ":".
 nfield: null field "na".
 numfmt: number formatter ",".
 rdlim: record delimiter "::".

Transaction Command ACQUIRE (ACQ A)

Syntax:
ACQ:date entered:as of date:asset1:price1:asset2:price2:amount2::

ACQUIRE attempts to obtain asset1 at price1 or better by selling amount2 of asset2 at price2 or better. These constraints are relaxed to a single cross-rate constraint (unless an interest rate instrument such as DXXXX or PAYOUT is involved) as follows:

> Bid for asset1 at a cross-price of price1/price2 in an amount equal to amount2˙(market-price2/market-price1) along with a corresponding offer for asset2 at a cross-price of price2/price1.

Specifying a price of 0 for either asset1 or asset2 suppresses that price criterion. In that case, the bid or offer is not longer a cross rate, and is executed if the non-zero price is satisfied. If both prices are 0, then amount2 of asset2 is sold at whatever market-price2 is determined to be, and those proceeds are used to purchase asset1 at whatever market-price1 is determined to be.

Examples:
ACQ:':931231:STLI:10:SMU:25000:.5::
 (The apostrophe indicates the previous entry date is used. The transaction is to take place "as of" Dec. 31, 1993. Shares in the enterprise STLI are to be bought at a price of no more than 10 (local currency) per share, using the proceeds from the ale of 0.5 SMUs at a price of no less than 25000 (local currency) per SMU. The prices need not be satisfied independently, but are considered to be a cross-rate).
ACQ:':93:DLEVR;01:8%:SMU:0.25%::

(The previous entry date is used, and the transaction is to take place "as of" 1993 on the default (for the ACQ transaction) date of Dec. 31. Debt of LEVR to mature in the year 2001 is to be bought at an interest rate of no less than 8% (the % sign is optional here), in exchange for 25% of the SMUs in the portfolio (here the % sign is necessary to distinguish from an absolute amount of SMUs) to be sold at whatever the market price is determined to be.)
ACQ:':':PAYOUT;FNBX;940701;981001;S;M:4%:SMU: 10000:20%::

(An annuity to be paid by financial institution FNBX extending from Jul. 1, 1994 to Oct. 1, 1998, with a right of survivorship and monthly payments, is to be purchased if the implicit interest rate is at least 4% (on the basis of a standardized actuarial table), with the proceeds from the sales of 20% of the SMUs in the portfolio at a price of at least 10000.)
ACQ:':':FCDM:75:SMU:0.5%::

(Acquire deutsche marks at 75 (local currency) per DM or better using proceeds from selling 5% of SMUs in the portfolio. The deutsche marks are to be kept in an interest bearing account (with short term maturity less than 1 year).)
Notes:

1. AN ACQUIRE transaction is only valid for one investment cycle. For example, for a calendar-year annual investment cycle, any ACQUIRE with an "as of" date in 1992 and entered by the cut-off date would be a candidate for executing during processing in early 1993, after which it would expire. However, if the "as of" date were in 1993, it would be skipped over until the next processing cycle.

2. If an enterprise offers shares of itself in excess of its "treasury shares", that is equivalent to a stock subscription (and presumably subject to regulatory oversight).

3. Certain assets cannot be used in the place of "asset2" to ACQUIRE other assets by any entity other than the issuer. For example, debt (DXXXX, DIXXXX and PAYOUT) is transmitted to custodial financial institutions via the Disposition File (DF). (Early liquidation of such debt instruments will likely entail negotiations with or through the custodial financial institution.) Even government-backed annuities (PAYOUT) are invalid as "asset2" (to prevent processing and asset-debasement difficulties). Therefore, the only debt-based instrument eligible to be used as "asset2" by an entity other than the issuer is debt of the government (e.g., DLEVR). Even this will not be supported in the first investment cycle, since there will be no such loans on the system initially. When it is allowed for entities other than the government to offer their holdings of its debt (which will aid in interest rate price discovery), adjustments to the face value of debt being liquidated will be made to take into account changes in net present value due to changes in price (i.e., interest rate).

4. Note that the government can enter ACQUIRE transactions, presumably with suitable public notice, to auction off bundles of SMUs or shares in specific enterprises at or above a fixed asking price.

Transaction Command BANK (B)
Syntax:
BANK:date entered:as of date:acronym::
BANK is entered by an enterprise to specify the financial institution which will process its debt payments.
Example:
ID:930415:931231:421145000SIEXYSTLI::
BANK:':':FNBR::

(Enterprise STLI specifies financial institution FNBR as its debt processing agent, as substantiated by any required off-line agreements and oversight approvals.)

ACQ:':':DFNBR;D:0:DSTLI;99.8%:100,000::

(STLI offers to borrow 100,000 (local currency) at 8% or less, to be repaid in 1999. In this case, any proceeds are to be held as a demand deposit with FNBR at prevailing rates.)
ID:930630:931231:19601120JSMXYJKLM::
ACQ:':':DSTLI;99:8%:DLEVR;D:0:50,000::

(Individual JS offers to liquidate 50,000 (local currency) of his demand loan to LEVR, and use these proceeds to lend to STLI at 8% or more, with the principal to be repaid in 1999.)

In this example, the loan would be consummated in an amount of 50,000 (local currency). Module PASS5 posts the resulting asset (in the form of a loan) of individual JS to the Disposition File (DF). Module DISPOSE includes a record for this asset in the Disposition File: Excerpt sent to financial institution FNBR (DFFNBR). Each year, STLI must then pay 4,000 (local currency) to FNBR for distribution to JS.

Transaction Command CANCEL (CXL C)
Syntax:
CXL:date entered:as of date:asset-specific ACQUIRE, PREVious or ALL transaction(s)::

This command provides the ability to cancel previous transaction(s) which have not yet been executed.
Examples:
CXL:931015:931015:ALL::

(Cancel all previously entered (but as yet unexecuted) transactions for this ID.)
CXL:':':SMU::

(Cancel previous transactions to acquire SMUs.)
CXL:940125:940125:PREV::

(Cancel previous transaction. This might be inserted during processing and a substitute transaction entered, if an error is detected.)
Notes:

1. Subsequent transactions with a "date entered" later than the CANCEL "as of" date are not canceled.

2. Transactions which were entered before the CANCEL "as of" date are not canceled if they were executed (i.e., an asset was already exchanged for another).

Transaction Command DELEGATE (DLG D)
Syntax:
DLG:date entered:as of date:delegated authority (Invest, Vote): asset(s):amount:delegatee-acronym:compensation(as % of Assets or Earnings)::

This transaction delegates either investment or voting authority over specified assets to the identified delegatee-organization.
Examples:
DLG:':':I:SMU:20%:INVI:10%E::

(Investment authority over 20% of the SMUs in the portfolio is offered to the delegatee organization INVI (which must be approved and registered) at a compensation of 10% of the subsequent earnings, taken to mean total return, including interest, dividends and stock appreciation (which will reflect the delegatee's investment decisions).)
DLG:':':I:SMU:10%:INVI:1%A::

(Investment authority over 10% of the SMUs in the portfolio is offered to delegatee organization INVI, at an annual compensation of 1% of the Assets, to be transferred without liquidation. Therefore, if the offer to delegate is consummated, and if there had been 1 SMU in the account, then 0.001 SMU (1% of 10% of 1) would be transferred from the portfolio to the delegatee organization.)
Notes:

1. Each delegatee organization must be approved and registered, with a maximum amount of assets under its discretion set at the lowest of: a statutory maximum, a limit set upon registration (based upon the organization's financial resources and perhaps the experience of its personnel), and a lower limit of its own choosing. Perhaps delegate organizations should be forbidden from purchasing for their own account assets vulnerable to manipulation, such as stock in individual enterprises. Offers to delegate are ranked in order of compensation in two lists (one for compensation as a percentage of assets, the other for compensation as a percentage of earnings).

The delegatee-organization has the option to establish minimum percentage compensation (by assets and earnings) which it will accept, and must specify in advance what percentage of the assets under its discretion is to be selected on the basis of asset-related compensation versus earnings-related compensation (see the PERCENTAGE command). For example, a delegatee organization with an aggressive investment philosophy might specify that only 10% of the assets under its discretion is to be selected from the highest compensation offers as a percentage of assets, while 90% is to be selected from the highest compensation offers as a percentage of earnings.

The actual compensation for all delegations is set a the lowest accepted offer (in the appropriate category), except that the lowest offers are truncated if they would reduce delegatee remuneration (i.e., if lowering the actual compensation rate would more than offset the increase in total amount). If the offered price P is expressed as a function of cumulative amount Q (starting from the highest offers), this is equivalent to solving for Q-accepted by:

maximizing: $P(Q) \times Q$;

subject to: Q-accepted $\leq$ Q-maximum-authorized;

and: $P(Q\text{-accepted}) \geq P(\text{minimum-acceptable})$;

and setting the price for all accepted delegations equal to P(Q-accepted). The list of registered delegatee organizations, a description of their personnel and expected investment approach, the percentage of assets to be accepted on the basis of assets versus earnings, and the maximum amount to be accepted should be regularly published.

2. Statutory constraints such as the prohibition of the sale of stock voting authority (especially over individual enterprises), as is the case in Western systems such as the United States to prevent abuse, can easily be implemented by setting the maximum compensation offer at zero. The result would in effect be a continuing and comprehensive "proxy" delegation.

3. If an individual acquires authority to enter transactions for the portfolio of another individual (such as an adult child being asked by an elderly parent to manage a portfolio), the responsibility for authentication rests with the same agency authenticating transactions entered by the actual portfolio owner. In other words, "delegation" (voluntary of otherwise) to an individual is transparent to Privatize™, and is authenticated by the "personnel" and/or "paperwork" system.

4. DELEGATION transactions entered by delegatee-organizations themselves are not allowed (except for their proprietary assets, when it might even be required). In other words, redelegation is not allowed. This is to prevent nearly intractable processing difficulties, in addition to avoiding the potential for an inappropriate convergence of investment strategies.

Transaction Command DIVIDEND (DIV D)
Syntax:
DIVIDEND:date entered:as of date:total dividend payment::
    DIVIDEND is entered by an enterprise, and specifies the total dividends which it has paid over to be allocated to shares contained in the PRIVATIZE!™ (a new system to achieve universal privatization) system. Module PASS1 uses this information in the process of calculating total portfolio earnings for reinvestment.
Examples:
DIVIDEND:':'100,000::
    (This enterprise has paid over 100,000 (local currency) to be proportionately allocated as dividends to all its shares on the PRIVATIZE!™ (a new system to achieve universal privatization) system.)
ACQ:':':VAL:S:DLEVR;D:S:100,000::
DIVIDEND:':':100,000::
    (This enterprise has extinguished 100,000 (local currency) worth of debt in LEVR for value received. That value received is the credit of 100,000 (local currency) to be distributed as dividends.
Notes:
    1. DIVIDEND is only valid in the transaction block of an enterprise.
    2. An appropriate government agency (such as the Privatization Board) must authenticate the transfer of sufficient resources to fund a DIVIDEND transaction.
    3. This transaction can also be used to distribute payments to shareholders as a result of a successful tender offer to take an enterprise private.

Transaction Command ELSE (E)
Syntax:
ELSE:ACQ:date entered:as of date:asset1:price1:asset2:price2:amount2::
    ELSE is designed to provide the option to execute an alternative ACQUIRE transaction if a primary DELEGATE or ACQUIRE transaction fails to be executed. This is intended to somewhat compensate for the significant interval in the investment cycle.
Examples:
DLG:':':I:SMU:20%:INVI:10%E::
ELSE::ACQ:':':DLEVER;D:0:SMU:0.20%::
    (Offer to delegate investment authority over 20% of the portfolio SMUs to delegatee INVI in return for 10% of earnings. However, if the offer is not consummated, exchange those SMUs for a demand loan to LEVR at prevailing prices.)
ACQ:':':DLEVR;D:10%:SMU:25000:20%::
ELSE:ACQ:':':FCDM:75:SMU:15000:20%::
    (Attempt to sell 20% of the portfolio SMUs at a price of at least 25000, and use the proceeds to purchase a demand loan to LEVR at an interest rate of at least 10%. However, if either price can't be obtained, then attempt to sell 20% of the portfolio SMUs at a price of 15000 or better, and use the proceeds to purchase deutsche marks for 75 or better (taking the prices to mean a cross-rate).)
Notes:
    1. ELSE can only follow a DELEGATE or ACQUIRE transaction.
    2. The body of an ELSE can only be an ACQUIRE transaction.
    3. If the ELSE follows an ACQUIRE, the asset pairs cannot be the same, in order to avoid wasteful processing overhead. For example, in the second example above, the prices of 25000 and 10% could not merely be relaxed to 20000 and 8% respectively in the subsequent ELSE transaction. For the purpose of his comparison, all debt of any particular entity is considered to be the "same" asset irrespective of maturity.

4. The decision whether to execute a primary transaction or its ELSE alternative is made by module PASS4 using price estimate #2 generated by module PASS3.

Transaction Command FILTER (FLT F)
Syntax:
FILTER:date entered:as of date:label:
account type:ID-acronym:birthdate interval:sex:aset(s):amount interval::
or
FILTER:date entered:as of date:label::

Filter is a transaction entered only by a delegatee organization (or the government itself) so that subsequent transactions only apply to selected portfolios or assets. Account type is a single letter (C,F,M,N,E,D or G) as follows: Citizen, Foreign investor, financial institution (Money), charitable institution (Need), Enterprise, Delegatee or Government. Delegatee transactions not preceded by a FILTER command apply to all assets under its discretion, both its own proprietary assets and those for which investment authority has been delegated to it. In practice, a delegatee-organization should initiate its transaction block with a pair of FILTER statements keyed to its own acronym, bracketing the transactions applicable to its proprietary account.
Examples:
FILTER:':':proprietary account:D:INVI::
. . .
FILTER:':':proprietary account::

(The transactions bracketed by the two FILTER transactions labelled "proprietary account" apply only to assets owned by the delegatee-organization INVI itself.)
FILTER:':':boomers:C:na:19501001;19601231:X:SMU:.5, 2.5::
. . .
FILTER:':':boomers::

(The transactions bracketed by the two FILTER transactions labelled "boomers" apply only to delegations by Citizens born between Oct. 1, 1950 and Dec. 31, 1960, whose account (including the non-delegated portion) contains between 0.5 and 2.5 SMUs.)
FILTER:heavy metal:E:STLI::
. . .
FILTER:heavy metal::

(The transactions bracketed by the two FILTER transactions labelled "heavy metal" apply only to delegations by Enterprise STLI.)
Notes:

1. Multiple filters (up to a maximum number equal to MAXFILT) can be simultaneously operative for a given delegatee, either nested or intersecting.

2. Inapplicable trailing fields can be omitted, as in the example labeled "heavy metal."

3. Matching FILTER transactions, and the transactions which they bracket, are considered a sub-block and kept intact throughout the merge-sorting or the Transaction Data Base (XDB).

4. FILTER sub-blocks entered by the government itself are always executed even if not "invoked" by the destination portfolio. For example, the government could initially allocate 0.5 SMUs to the "social security" account of all citizens born on or before Jan. 1, 1928 with the following transactions:
FILTER:':':pensioners:C:na:18700101;19280101:na:na:na::
SECURITY:':'::
ACQ:':':SMU:S:LSER:S:.5::
SECURITY:':'::
FILTER:':':pensioners::

Transaction Command GRADE (G)
Syntax:
GRADE:date entered:as of date:evaluator acronym:evaluatee acronym:evaluation:

GRADE allows an authorized evaluator organization to enter its evaluation of another organization which is capable of standing behind debt or an annuity. The evaluation is entered on a scale of 0 to 100, with a standardized interpretation of various scores to be promulgated by the government agency capable of authorizing organizations to enter such evaluations. This grading information is used to inform the public. Collective grading information can also be used to aggregate bids and offers of comparable organizations in the process of estimating market-clearing interest rates and generating a lending report to update borrowing transactions.
Example:
GRADE:':':SNP:MLPF:90::

(Authorized evaluator organization SNP grades the financial stability and creditworthiness of organization MLPF at 90.)

Transaction Command IDENT (ID I)
Syntax:
ID:date entered:as of date:ID code:name:address: phone:supplementary name::

ID identifies the entity which owns and controls a portfolio (either a Citizen, Foreign investor, Enterprise, financial institution (Money), charitable institution (Need), Delegatee organization, or Government). It remains operative for subsequent transactions until another ID transaction is entered. The contiguous set of transactions associated with a particular ID is termed a "block."
Examples:
ID:930215:930101:19601120JSMXYJKLM:John Smith:
100 Main Street; Anywhere:55-1212(h);555-1213(w):Jones::

(Field 4: This is a citizen (the first digit in the ID code is a 1 or 2) born Nov. 20, 1960, with initials JS, Male, with ID first issued by regional center XY, and distinguishing personal code of JKLM. Field 5: name. Field 6: address. Field 7: telephone(s) (if any). Field 8: mother's maiden name.)
ID:930215:930101:34567890IUAXYQRST:Investors Unlimited:
100 Geldstrasse;Zurich, Switzerland:01/012/555-1111:Manfreq Q. Contact::

(Field 4: Foreign investor (first digit is a 3, while the following digits can be used to code individuals versus organizations), initials IU, Alien, ID first issued by processing center XY, distinguishing code QRST. Fields 5–7: name, address, telephone(s). Field 8: contact person.)
ID:930215:930101:421145000SIEXYSTLI:Steel Inc.:
1 Steel Inc. Plaza;Steel City:555-5555:Steely Dan Executive::

(Field 4: Enterprise (first digit a 4), industrial code=21, enterprise #=45000 (independent of industrial code), initials SI, Enterprise, ID first issued by process center XY, enterprise acronym STLI (should be unique and correspond to enterprise #). Fields 5–7: name, address, telephone(s). Field 8: contact person (presumably CEO).)
ID:930215:930101:51100100FNMXYFNBR:First National Bank of Rocket City:
1 First National Bank Plaza;Rocket City:555-6666:Rock E. Fella::

(Field 4: Financial institution (first digit a 5), with financial institution code (e.g., bank, insurance company, pension fund, brokerage house, evaluator-organization) of 11, financial institution #=100 (independent of financial institution cod), initials FN, Money, ID first issued by processing center XY, financial institution acronym FNBR.)

ID:930215:930101:60100001CVNXYSOSV:Friends of SOS Childrens' Villages International:1170 Broadway;NY;10006::

(Field 4: charitable institution (first digit a 6), with charitable institution code of 01, charitable institution #=001 (independent of charitable institution code), initials CV, Need, ID first issued by processing center XY, charitable institution acronym SOSV.)

ID:930215:930101:79900150DUDXYDECU:Decisions Unlimited:

711 Analysis Plaza;Rocket Science City:777-777:Lucky Eddie, Ph.D.::

(Field4: Delegatee organization (first digit a 7), organization code=99, delegatee organization #=150, initials DU, Delegatee, ID first issued by processing center XY, (unique) acronym DECU. Fields 2–4: name, address, telephone(s). Field 5: contact person.)

ID:930215:930101:90300000LRGXYLEVR:Leviathan Republic:

1 Memorial Drive;Capital City:111-1111:John Q. Appointee, MoF::

(Field 4: Government (first digit a 9), nation-state #=03, regional government #=00 (i.e., not applicable-"na"), local government #=000 (i.e., 'not applicable-"na") (note that transactions for a local government would have appropriate index numbers for both regional and local government), initials LR, Government, ID first issued by processing center XY, (unique) acronym LEVR.)

Note:

For some purposes (e.g., when an enterprise specifies its employees, and citizen records are automatically generated for incorporation into each employee's individual transaction block) the fields after the ID code can be omitted.

Transaction Command JOIN (JN J)

Syntax:
JOIN:date entered:as of date:enterprise acronym:
capacity (Ceo, Board, Officer, Employee (non-officer)):
stock compensation (denominated in local currency, # of shares, or % of outstanding shares)::

This transaction indicates that an individual joined an enterprise as of the specified date, in the indicated capacity. This record is originally entered by the enterprise, which submits a series of such JOIN records, but with the "enterprise acronym" field replaced by an "individual code" field. These enterprise JOIN transactions are then used to generate individual JOIN transactions. This generation will take place late in the processing cycle, after all enterprise data has been centralized, to inhibit intentional or unintentional errors. (For example, instances where an individual is reported to be affiliated with multiple enterprises are reported. This will also help in the review of Privatization Business Plans to flag potential overlap of enterprises.)

Examples:
ID:930215:930101:421145000SIEXYSTLI:Steel Inc.::
JOIN:':':19431120JRMXYABCD:C:.01%::
JOIN:':':19500125PJMXYZYXW:O:100S::
  JOIN:':930701:19501205MSMXYFGHI:E:500::

(This sequence of transactions is entered by enterprise STLI, and results in the following individual JOIN transactions being generated.)

ID:930215:930101:19431120JRMXYABCD::
JOIN:':':STLI:C:0.1%::

(As of Jan. 1, 1993, this individual joined enterprise STLI as its CEO, with annual stock compensation equal to 0.01% of outstanding shares.)

ID:930215:930101:19500125PJMXYZYXW::
JOIN:':':STLI:O:100S::

(This individual joined as an Officer, with annual stock compensation equal to 100 shares.)

ID:930215:930701:19501205MSMXYFGHI::
JOIN:':':STLI:E500::

(MS joined STLI as an employee (non-officer) halfway through the year, with stock compensation of 500 (local currency) per annum. Therefore, 250 units of local currency will be used to purchase shares of STLI for his account.)

Transaction Command LEAVE (LV L)

Syntax:
LEAVE:data entered:as of date:enterprise acronym::

This transaction specifies that an individual has left an enterprise on the given data. Therefore, stock compensation is terminated as of that date. Like the JOIN transaction, individual LEAVE transactions are generated from LEAVE transactions submitted by the enterprise.

Example:
LEAVE:930901:930815:STLI::

(This individual left enterprise STLI on Aug. 15, 1993, up to which point any applicable stock compensation will be prorated.)

Transaction Command NOTE (N)

Syntax:
NOTE:data entered:as of date:non-executing commentary::

NOTE provides the ability to introduce commentary.

Example:
NOTE:':':Previous record was cancelled due to apparently incorrect data in the last field. Ms. Q. X. Datachecker.::

Transaction Command OVERSIGHT (OVER O)

Syntax:
OVER:date entered:as of date:enterprise acronym: privatization date:demonopolization date:confiscation percentage::

Only the Privatization Board (or other authorized government agency) can submit this transaction, which establishes the privatization and demonopolization dates of an enterprise. Achievement of privatization is a prerequisite for accrual of compensation stock in privatized large state enterprises. Achievement of demonopolization is a prerequisite for recipients of such compensation stock (whether as a member of the board, officer, or non-officer employee) to transfer (away) any stock in that enterprise (even if some of it had been purchased, and even if the individual has already left the enterprise).

The "confiscation percentage" is equal to the Privatization Board's estimate of the percentage of share value at demonopolization attributable to monopoly rent arising subsequent to privatization. The "confiscation percentage" of compensation stock earned previous to certification of demonopolization is automatically transferred to the government's social welfare account. However, if certification of demonopolization is achieved (on an "as of" basis) within a safe harbor interval (e.g., 1 to 2 years), then the "confiscation percentage" must be set to 0.

The net result is to strongly encourage those individuals entitled to compensation stock in an enterprise to achieve its demonopolization as rapidly as possible.

Examples:

OVER:930315:930315:STLI:930601::

(The Privatization Board approved the Privatization Business Plan of enterprise STLI, and set the effective date of privatization to be Jun. 1, 1993, perhaps to coincide with an entire cohort of enterprises being privatized. Note the absence of the inapplicable trailing fields.)

OVER:940601:940601:STLI:930601:940515::

(The Privatization Board certifies the demonopolization of STLI on May 15, 1994.)

Notes:

1. This transaction applies only to privatized large state enterprises. Authentication of other enterprises allowed onto the PRIVATIZE!™ (a new system to achieve universal privatization) system is the responsibility of the agency with authority over operation of module EGEN which generates the Enterprise File (EPRISE) (see Appendices 1 and 2).

2. It remains possible for key executives to purchase, before demonopolization is achieved, stock in their enterprise at prices which do not sufficiently anticipate subsequent monopoly rent. Therefore, any request for certification of demonopolization submitted after the safe harbor interval should include the transaction blocks of members of the board and officers of an enterprise. The Demonopolization board could then condition certification of demonopolization upon confiscation of any appropriate percentage of even non-compensation (i.e., purchased) stock in the enterprise. This authority would presumably only be invoked in cases of significant abuse.

Transaction Command PERCENTAGE (PER P)

Syntax:

PER:':':minimum compensation (% of assets):minimum compensation (% of earnings): maximum amount of assets under discretion:% of assets selected on the basis of compensation by earnings::

PERCENTAGE enables a delegatee-organization to specify its minimum acceptable compensation, the maximum amount of assets under its discretion and the percentage to be selected on the basis of compensation by earnings (with the rest selected on the basis of compensation by assets).

Examples:

PER:':':5:5:250,000,000:77::

(This delegatee-organization requires that its compensation be at least 0.5% of assets or 5% of earnings; it will not accept discretion over total assets exceeding 250,000,000 (in local currency); and it chooses to have 77% of the delegated assets under its discretion selected on the basis of earnings.)

Notes:

1. Statutory and decretal constraints remain, such as maximum compensation percentages and maximum amount of delegated assets subject to discretion by any single delegatee-organization.

2. Regulatory constraints also remain, such as any stricter limit on the maximum amount of delegated assets on this particular delegatee-organization imposed by its oversight agency.

3. There is no guarantee that there will be any offers to delegate which exceed the minimum compensation percentages. On the other hand, the maximum amount of assets may be reached with all offers higher than those minima.

4. Default values are established by law or decree, and are contained in INCLUDED MODULE—GLOPARMS.

5. The PERCENTAGE record which DELCOMP posts at the end of the Delegatee Order File (DORF) does not update the Transaction Data Base (XDB),and so is unambiguously attributable to DELCOMP (rather than to the delegatee itself) by its context.

Transaction Command REINVEST (RNV R)

Syntax:

RNV:date entered:as of date:asset 1:%:asset2:%: . . . :assetn:%::

REINVEST specifies how the earnings of a portfolio are to be invested.

Example:

RNV:930215:931231:ESTLI:50%:SMU:20%:
DLEVR;96:5%:DLEVR;97:5%:DLEVR;98:5%:FCUS:15%::

(Invest 50% of portfolio earnings in enterprise STLI, 20% in SMUs, 5% in debt to LEVR maturing in each of 1996, 1997 and 1998, and 15% in U.S. dollars.)

Note:

Dates are used only to determine the most recent, and therefore controlling, REINVEST transactions.

Transaction Command SECURITY (SEC S)

Syntax:

SECURITY:date entered:as of date:

SECURITY transactions are entered in pairs. The transactions which they bracket apply to the "social security" portion of a portfolio, for which valid assets are limited to Stock Market Units (SMUs), government debt (DXXXX or DIXXXX specifying a governmental entity), lifetime annuities (PAYOUT) or other specified assets.

Examples:

SECURITY:921115:930101::
ACQ:':':SMU:S:LSER:S:0.25::
SECURITY:':'::

(This "initialization transaction" exchanges 0.25 Large State Enterprise Rights for SMUs (Stock Market Units) at the Statutorily nominal price of 1 SMU per LSER. Since it is bracketed by SECURITY transactions, the SMUs are contained in the "social security" portion of the portfolio. If in addition there is a freely transferable SMU allocation of 1 per citizen, this corresponds to a statutory set-aside of 20% into the restricted "social security" portion of a citizen's portfolio).

SECURITY:':'::
ACQ:':':DILEVR;00-10:2.5
ACQ:':':PAYOUT;FNBR;60;D;N;M:5%:SMU:0:0.1::
SECURITY:':'::

(Exchange 0.1 SMU of the "social security" portfolio at prevailing prices for indexed debt in government LEVR, attempting to obtain the highest yield within the maturity interval 2000 to 2010, but no less than 2.5% above inflation. Exchange another 0.1 SMU for a lifetime annuity starting at age 60 without right of survivorship, payable monthly by FNBR, if the implicit interest rate is at least 5%.)

Notes:

1. The SECURITY transaction is only valid for citizens (whose first digit in the ID code is a 1 or 2) or for the government.

2. Matching SECURITY transactions, and the transactions which they bracket, are considered a sub-block and kept intact throughout the merge-sorting of the Transaction Data Base (XDB).

3. Initially, TRANSFER and DELEGATE commands are invalid within a SECURITY sub-block, so that the government maintains custody over, and the individual citizen maintains investment authority over, the "social security" portfolio.

4. In cases of hardship justifying immediate distribution of part of the "social security" account, ACQUIRE transactions in exchange for "value received" (VAL) would be entered for a citizen's portfolio directly by the government welfare agency authenticating the situation and paying out the proceeds.

Transaction Command TRANSFER (XFER T)

Syntax:

TRANSFER:date entered:as of date:financial institution acronym:asset:amount::

TRANSFER directs that the specified amount of the indicated asset be transferred to the financial institution identified by "acronym." This transfer will take place at the completion of the processing cycle, via the Disposition File. While the TRANSFER asset amount can be expressed as a percentage of portfolio contents, PASS5 translates that to an absolute amount prior to writing the information to the Disposition File.

Examples:

XFER:':':MLPF:ESTLI:100%::

XFER:':':MLPF:SMU:50%::

Transfer 100% of the portfolio stock of enterprise STLI, and 50% of the SMUs, to financial institution MLPF.)

XFER:':':DBNK:FCDM:100%::

(Transfer 100% of the portfolio deutsche marks to financial institution DBNK.)

Notes:

1. The financial institutions must be authorized to act as custodians of that type of asset.

2. When alternative, non-governmental financial institutions become authorized to act as custodians of entire portfolios, transactions of the form:

XFER:':':MLPF:ALL:100%:: would become valid. This will provide a vehicle whereby particularly large or active portfolios could be removed from the general processing system, reducing its overhead and enabling investment transactions more frequent than the general investment cycle.

Transaction Command WHEN (W)

Syntax:

WHEN:entered date:as of date::

WHEN sets the entered date and the "as of" date.

Example:

REINVEST:930215:930215:ALL:50%:

SMU:20%:DLEVR;96:5%:DLEVR;97:5%:DLEVR; 98:5%:FCUS:15%:FCJY:10%::

CXL:940125:940125:PREV::

REINVEST:940125;931231:ALL:50%:

SMU:20%:DLEVR;96:5%:DLEVR;97:5%:DLEVR; 98:5%:FCUS:5%::

NOTE:':':Reinvest record replaced because more than 100% allocated, so deleted from last field to reach 100%.::

WHEN:930215:930215::

(In this sequence, the original REINVEST record was erroneous. During the processing cycle, it is canceled (rather than merely dropped, in order to maintain a complete audit trail) and replaced, and the date is then reset with the WHEN command so as not to affect subsequent transactions.)

Asset Category ALL: All Assets

This asset category corresponds to the composite of all the assets in a portfolio. Note that this is an invalid asset to bid for (as "asset1" in an ACQUIRE record), and must be used with a price of "0" (i.e., offering the portfolio assets at the market prices to be determined) when used as "asset2" in an ACQUIRE record.

Asset Category DXXXX:Debt

Syntax:

:DXXXX;YY;rr:

Debt is a portfolio asset of the lender (and corresponding liability of the borrower). Acronym XXXX specifies the borrowing entity, and is restricted to governmental entities, financial institutions and enterprise.

The year of maturity is specified by YY, with "D" corresponding to a demand loan. A demand loan would be appropriate if the lender deposited cash with the expectation of purchasing other financial instruments at the next investment cycle. At maturity, the proceeds are invested in liquid debt of the state (e.g., DLEVR;D) at prevailing interest rates. The simple annual interest rate of the debt instrument is specified by rr, which is an optional subfield when entering transactions unless needed to resolve ambiguities between debt instruments in a portfolio.

Offers to lend in an ACQ transaction must be matched up with a corresponding offer to borrow in order to be consummated. Matching requires identical acronyms and either identical or overlapping maturities.

During the second processing pass through the final sorted Transaction Data Base (XDB), PASS2 approximates the amount of offers to lend by acronym, maturity and price, and a (brief) opportunity is made available to potential borrower-entities to update any offers to borrow with appropriate ACQ transactions. This enhances debt management capabilities. Module PASS5 calculates the debt interest rate rr from the bids and offers and posts it to the updated XDB.

Prices are specified as the simple annual interest rate of the debt.

Example:

:DLEVR;01:

(Debt of LEVR to mature in the year 2001.)

Notes:

1. The year of maturity can be selected according to the personal circumstances of the lender. This may increase the attractiveness of debt and therefore the amount invested in it. However, a borrower can choose to manage its debt by bidding only for specified maturities (e.g., 5, 10 and 20 years), presumably with appropriate public notice.

2. In the future, it may be desirable to allow specification of maturity intervals, within which the processing system attempts to maximize the yield, to smooth out the yield curve. Since a steep yield curve (with yields quickly increasing as maturities lengthen) is often associated with fiscal stimulus and inflation, and an inverted yield curve (with short-term yields above long-term yields) is often associated with tight money triggering a recession, a tendency toward a smoother yield curve may not only facilitate debt management but also economic stabilization.

3. This asset assumes the repayment of the entire original principal (i.e., the face value) at maturity. More sophisticated instruments could remove this constraint by allowing arbitrary periodic and final payments. These could range from a zero final payment (i.e., an annuity) to zero periodic payments (i.e., a zero-coupon bond).

Asset Category DIXXXX: Indexed Debt

Syntax:

:DIXXXX;YY;rr:

The indexed debt instrument DIXXXX is exactly analogous in all respects to the un-indexed debt instrument DXXXX, with the exception that interest rates are expressed in "real" terms (i.e., after inflation as estimated by an index specified by statute or decree), and the outstanding balance is periodically readjusted for inflation.

Note:

If a financial institution accepts indexed deposits, account holders have an inflation hedge. If the financial institution in turn lends those funds to enterprises as indexed debt with an interest rate markup, it is also hedged against inflation. The enterprises would then presumably conduct their operations in a way to cope with prevailing inflation.

Asset Category EXXXX: Enterprise Stock

Enterprise stock represents shares in enterprise XXXX. For privatized large state enterprises, shares are tradeable only after approval of the corresponding privatization business plan (PBP), and the sale of compensation stock is prohibited until after certification of achievement of the demonopolization goals contained in the PBP.

Prices are specified in local currency per share.

Asset Category FCXX: Foreign Currency

This asset represents foreign currency for country XX, e.g., U.S. dollars (FCUS) or deutsche marks (FCDM). Other currencies can be readily added.

The foreign currency is expected to be held in a liquid account yielding an appropriate rate of interest.

The price is specified as local currency per foreign currency.

Asset Category PAYOUT: Cash or Annuity

Syntax:

:PAYOUT;government or financial institution acronym; begin;end;survive;frequency; implicity interest rate;actuarial table #;periodic payment:

PAYOUT designates a generalized annuity.

One option is cash, available to the portfolio owner (after the processing cycle is completed) from the financial institution specified in subfield 2. Cash is specified by setting the begin and end times equal, and on or before the "as of" date of the processing cycle. However, this would presumably be an inappropriate option if demand deposits (DXXXX or DIXXXX) were available through an acceptable financial institution.

The alternative is a stream of payments over an interval with a specified beginning and end, an "annuity." The beginning can be specified as a date (year, month and date, in the form yymmdd) or an age in years (in the form XX). The end can be specified as a date, an age or death (specified by D). If the end is specified as a date or an age, the portfolio owner can also specify whether the payments should continue upon his or her death. The default of payment termination upon death, with higher payout amounts, can be overriden with an S in the "survive" subfield (otherwise the subfield is left empty or filled with N). Unless the portfolio owner is an individual, begin and end dates cannot be ages and an S is used irrespective of the entry in the "survive" subfield. Payment frequency can be specified as annual (A), quarterly (Q), monthly (M), or weekly (W).

The annuity payment amounts are calculated by module "ACTUARY", taking into account standardized survival tables. If a government is acting as principal, actuarial shortfalls can be covered off-budget by the SMUs or enterprise stock kept in its social welfare account; actuarial windfalls can likewise be credited to that account. Financial institutions acting as principals could perhaps contract with the government for partial actuarial insurance backed by that same account.

The price of an annuity is specified as the implicit rate of return assuming a particular actuarial table. Module PASS5 determines the execution price of a transaction from all bids and offers, and then posts it, the identifier of the corresponding actuarial table and the periodic payment amount as the last three subfields of the PAYOUT asset (which are unneeded if unnecessary to resolve ambiguity) to the updated Transaction Data Base (XDB).

Note:

The annuity can be considered to be indexed to the inflation rate (see discussion under asset DIXXXX), or an additional instrument PAYOUTI can be created to serve that purpose. If the annuity is indexed, then the implicit rate is the "real" return (with inflation factored out). In this case, the financial institutions make available payment streams which vary with future inflation.

Asset Category PLAM: Price Level Adjusted Mortgage

Syntax:

:PLAM;description;XXXX;YY;rr:

PLAM designates a price level adjusted mortgage, i.e. a mortgage which achieves the same real consequences for both the borrower and lender as a traditional mortgage in the absence of inflation. This mortgage can apply to flats, shops, land or government equipment. The description field contains information specifying the particular property securing the mortgage. PLAM is unique, in that it arises by negotiation outside the computer system and is then entered simultaneously for the mortgagor and mortgagee.

In the transaction block for the mortgagor, XXXX specified the acronym of the mortgagee, and is restricted to governmental entities and financial institutions. In the transaction block for the mortgagee, XXXX specifies the identification code of the mortgagor. While PLAM represents an asset of the mortgagee, it represents a liability of the mortgagor in whose transaction block it is located. The year of maturity is specified by YY. The "price" of this mortgage instrument is the simple real annual interest rate as specified by rr.

The actual payment for each period is calculated using the annuity formula with the outstanding balance, years to maturity and real interest rate. A new balance outstanding at the end of each period is calculated by adding the beginning balance, the real interest on it, and a revaluation found by multiplying the beginning balance by the rate of inflation, and then subtracting the actual payment for the period. This process is repeated until the year of maturity YY, when the mortgage should be paid off.

The assumption is that the mortgagor will maintain or deposit sufficient demand deposits to satisfy the mortgage payments. However, other assets on the system can be available as collateral.

Example:

ID:930201:930201:19601120JSMXYJKLM::

ACQ:':'VAL:S:

PLAM;Shop at 1776 Glavnaya Ulisa;LEVR;2007;3%:S:100,000::

ACQ:':':VAL:S:SMU:S:0.5::

NOTE: Payment included 10,000 cash, in addition to the mortgage and 0.5

SMUs. ID:';':LEVR:: ACQ:':'PLAM;Shop at 1776 Glavnaya Ulisa; 19601120JSMXYJKLM;2007;3%:VAL:S:100,000::

ACQ:':':SMU:S:VAL:S:0.5::

NOTE: Payment included 10,000 cash, in addition to the mortgage and 0.5 SMUs.

(The individual specified by the first ID transaction has acquired the shop at 1776 Glavnaya Ulisa from the LEVR government in return for 10,000 cash, 0.5 SMUs and a mortgage at a real interest rate of 3% with maturity in 2007 and face value of 100,000 local currency. If a regional or local government is entitled to a share of the proceeds due to conducting the auction, additional ACQ transactions can be entered for its portfolio.)

Asset Category SMU: Stock Market Unit

Stock Market Units (SMUs) are created by legislation or decree. A SMU incorporates one share of each large state enterprise privatized by the end of 199X (e.g., 1993), where X is specified in the legislation or decree. "Privatization" occurs upon the "privatization date" specified in an approved privatization business plan submitted by an enterprise.

Note that stock ownership rights to SMUs (see Virtual Asset: Large State Enterprise Rights) which incorporate rights to shares in enterprises privatized by a future date certain are created immediately by the legislation or decree.

Prices are specified in local currency per SMU.

Asset Category SMU2: 2d Tranche of SMUs

SMU2s are analogous to SMUs, and are also created by legislation or decree. A SMU2 incorporates one share of each large state enterprise privatized between 199X and 199Y, where X corresponds to the cut-off for inclusion of enterprise stock in a SMU, and Y is the corresponding SMU2cut-off. X and Y are established by legislation or decree. For example, SMUs could comprise one share of each large state enterprise privatized by the end of 1993, while SMU2s could comprise one share of each large state enterprise privatized from the beginning of 1994 to the end of 1995 (a two year period).

Prices are specified in local currency per SMU2.

Notes:

1. To encourage early privatization, executive and board compensation set by statute or decree can be more attractive for earlier privatization.

2. To prevent useless speculation, an initial moratorium (e.g., one year) on trading SMU2s could be imposed. During such an interval, there would likely be little reliable information with which to value such a deferred asset, and it is unclear what near-term utility enhanced price discovery for SMU2s would provide.

Asset Category VOUCHER: Privatization Voucher

The privatization voucher is authorized by legislation or decree. In the context of appropriate enabling regulations, it is possible to interpret it as the right to one citizen's share of the publicly distributable capital of each large state enterprise privatized by the end of 199X, where X is specified in the legislation or decree (e.g., 1993). It is the physical analogue in script form of the Stock Market Unit (SMU) asset on the PRIVATIZE!™ (a new system to achieve universal privatization) system.

A typical transaction redeeming a physical voucher for a Stock Market Unit could be:

ACQ:921201:931231:SMU:S:VOUCHER:S:1::

ACQ:':931231:ESTLI:2000:SMU:0:0.5::

(The first transaction, entered on Dec. 1, 1992 and taking effect as of Dec. 31, 1993, exchanges one privatization voucher for one Stock Market Unit (SMU) at the statutorily nominal price of 1 SMU per VOUCHER. The second transaction, entered on the same date, places a bid for shares in enterprise STLI at a price not to exceed 2000 (local currency), using the proceeds of half the Stock Market Unit liquidated at the market price effective on Dec. 31, 1993.)

Asset Category Virtual Asset: Donation Rights (DR)

Donation rights are "transferred" to a donor in exchange for a gift, and are perhaps better described as a "donation privilege."

Cross-prices are a statutorily nominal 1 Whatever per DR.

Example:

ID:921015:921015:19601120JSMXYJKLM::

ACQ:':':DR:S:SMU:S:0.1::

ID:':':60100001CVNXYSOSV::

ACQ:':':SMU:S:DR:S:0.1::

(The individual specified by the first ID record has donated 0.1 SMU (at the Statutorily nominal price of 1 SMU per DR) to the charitable institution specified by the subsequent ID record. A donation must be entered as a contiguous matched pair including donor and donee. Module XACT will sort the transactions for eventual incorporation into transaction blocks containing the complete set of transactions for each ID. However, in the case of a donation, XACT will also generate "documentation" notes. A note containing a clone of the donee ID record will be inserted immediately following the donor's ACQ record. An analogous note containing a clone of the donor ID record will be inserted immediately following the donee's ACQ record.)

Asset Category Virtual Asset: Large State Enterprise Rights (LSER)

Large state enterprise rights are created by statute or decree, for instance when Stock Market Units (SMUs or SMU2s) are brought into being.

Cross-prices are a statutorily nominal 1 Whatever per LSER.

A typical initialization transaction for a citizen would be:

ACQ:921201:921231:SMU:S:LSER:S:1::

(This transaction, entered Dec. 1, 1992 and taking effect as of Dec. 31, 1992, would exchange 1 LSER (Large State Enterprise Right) for SMUs (Stock Market Units) at the Statutorily nominal price of 1 SMU per LSER. Note the implicity transfer, from the state as trustee or from the government as custodian, of the Large State Enterprise Right).

Asset Category Virtual Asset: Other State Property (OSP)

These rights in small state enterprises such as shops or small businesses are granted an individual or enterprise in return for some exchange such as a combination of cash, a mortgage or a contractual commitment to maintain a certain size workforce with specified salaries and benefits. Typically, these rights would be auctioned by a local government entity, which could be entitled by statute to a percentage of the bid and so would be motivated to devise a strategy to maximize its combined value. An individual could also bid a portion of the SMUs (Stock Market Units) in his or her portfolio.

This same approach can be applied to land, flats and government equipment, all of which can be privatized in exchanged for a combination of cash or mortgages.

Cross-prices are a statutorily nominal 1 Whatever per OSP.

For example, assuming SMUs are legislated into being on Oct. 1, 1992, even before they are "operationalized" an individual's current interest could be transferred as part of a successful bid for a small state enterprise as follows:

ID:921015:921015:19601120JSMXYJKLM::
ACQ:921015:921015:OSP:S:SMU:S:0.5::
ID:':':90304005LGGXYLOCG:Local Government::
ACQ:':':SMU:S:OSP:S:0.15::
ID:':':90304000RGGXYREGG:Regional Government::
ACQ:':':SMU:S:OSP:S:0.1::
ID:':':90300000LRGXYLEVR:Leviathan Republic::
ACQ:':':SMU:S:OSP:S:0.25::

(On Oct. 15, 1992, an individual (specified in the initial ID record) transferred 0.5 of his SMUs as part of a successful bid for rights in a small state enterprise. These SMUs are transferred 30% to the local government arranging the auction, 20% to the regional government and 50% to the state. Note that all transactions occur at the Statutorily nominal price of 1 SMU per OSP.)

Asset Category Virtual Asset: Testamentary Rights
(TR)

These are transferred from a legatee "to" a decreased individual in exchange for a bequest, as certified and entered by appropriate local authorities after processing any will or conducting any "probate."

Cross-prices are a statutorily nominal 1 Whatever per TR.
Example:
ID:930815:930715:19431120JRMXYABCD::
ACQ:':':TR:S:ESTLI:S:1000::
ID:':':19630704MRMXYBCDE::
ACQ:':':ESTLI:S:TR:S:1000::
NOTE:Bequest of 1000 shares of STLI from JR to MR.::
ID:':':19431120JRMXYABCD::
ACQ:':':TR:S:ALL:S:50%::
ID:':':19460630ERFXYCDEF::
ACQ:':':PAYOUT;FNBR;940101;D;N;M:S:TR:S:50%::
NOTE:50% of the portfolio balance is to be liquidated on behalf of ER to purchase a lifetime annuity through FNBR payable monthly without right of survivorship.::
ID:':':19431120JRMXYABCD::
ACQ:':':TR:S:ALL:S:30%::
ID:':':19830210LRFXYDEFG::
ACQ:':':PAYOUT;FNBR;940101;030101;S;A:S:TR:S:30%::
NOTE:Another 30% is to be liquidated on behalf of LR to purchase a 9 year annuity from FNBR payable annually, with a right of survivorship.::

ID:':':19431120JRMXYABCD::
ACQ:':':TR:S:ALL:S:20%::
ID:':':60100001CVNXYSOSV::
ACQ:':':DFNBR;D:S:TR:S:20%::
NOTE:The remaining 20% is liquidated on behalf of charitable institution SOSV, and transferred to it as liquid assets deposited in FNBR.::

Notes:

1. Bequests will generally be liquidated and then used to purchase assets such as PAYOUT or DXXXX;D (to avoid the significant difficulty of transferring percentages of an entire portfolio intact). The exception is when fixed (non-percentage) amounts of specific assets (such as enterprise stock, in order to preserve control) are transferred. However, the nature of the processing cycle and serial storage media make it difficult to verify that the asset actually existed in the specified quantity in the portfolio of the deceased. Therefore, the legatee may assume any risk associated with entering a transaction involving that asset which must be subsequently "reversed.")

2. As in the treatment of Donation Rights, appropriate "documentation" notes will be generated prior to sorting the transactions by ID.

Asset Category Virtual Asset: Value Received
(VAL)

This asset is a placeholder representing value received outside the PRIVATIZE!™ (a new system to achieve universal privatization) system.

Cross-prices are a statutorily nominal 1 Whatever per VAL.

Example:
ID:':':ID code of new stock subscriber #1::
ACQ:':':ENEW:S:VAL:S:1000::
ID:':':ID code of new stock subscriber #2::
ACQ:':':ENEW:S:VAL:S:500::
ID:':':ID code of new stock subscriber #3::
ACQ:':':ENEW:S:VAL:S:20::

(This series of transactions, only entered by enterprise NEW itself (as authenticated by an appropriate government agency such as the Privatization Board) transfers a total of 1,520 shares of stock to three subscribers.)

Note:

Acquiring any asset in the PRIVATIZE!™ (a new system to achieve universal privatization) system in exchange for value received outside it requires satisfactory documentation and authentication.

Having now described a few embodiments of the invention, it should be apparent to those skilled in the art that the foregoing is merely illustrative and not limiting, having been presented by way of example only. Numerous modifications and other embodiments, including combinations of features found in the illustrated embodiments, are within the scope of one of ordinary skill in the art and are contemplated as falling within the scope of the invention as defined by the claims.

What is claimed is:

1. A method to achieve widespread share ownership by aggregating rights to state owned assets, in the context of uncertainty and volatility in the value of said state owned assets, and in the context of constraints on investment sophistication and technical infrastructure, comprising the steps of:

implementing an endowment phase, said endowment phase comprising:
  establishing entitlement criteria to a portion of a tranche of state owned assets with independently tradeable shares,
  generating a list of portfolio owners according to said entitlement criteria,
  endowing each portfolio owner on said list with a number of Stock Market Units according to said entitlement criteria, each Stock Market Unit consisting of a standardized portion of said tranche of state owned assets, and
  selecting the state owned assets to be included in said tranche; and
implementing one or more investment cycles, each such investment cycle comprising:
  a transaction collection phase during which transactions are collected from portfolio owners on said list and stored in a transaction data base suitable for processing by a digital computer system,
  a transaction processing phase during which the transactions stored in the transaction data base are processed on a digital computer, and a disposition phase, said transactions comprising:
    bids and offers for Stock Market Units and shares of the assets represented in the Stock Market Units,
    orders to sell an amount of one asset and use the proceeds of such sale to purchase another asset contingent on the ratio of the prices of the two assets, and
    instructions to transfer portions of assets to financial institutions able to exercise custody or disburse cash balances,
  the processing of said transactions comprising:
    creating synthetic bids for Stock Market Units by aggregating bids for a set of assets represented in the Stock Market Units, said synthetic bids to be treated as alternative to the bids so aggregated,
    iteratively calculating market-clearing prices which satisfy the largest amount by value of bids and offers, and
    using approximate asset prices determined prior to the final iteration of the calculation of market-clearing prices in evaluating order contingencies, and
  the disposition phase comprising:
    execution of the instructions to transfer portions of assets to financial institutions able to exercise custody or disburse cash balances.

2. The method of claim 1, adapted to increase public support for the process of privatization by initiating the investment cycle process pending selection of the state owned assets to be included in said tranche.

3. The method of claim 1, where the state owned assets include one or more of tax proceeds, proceeds from bond issues, and newly created currency.

4. The method of claim 1, where part of the endowments of portfolio owners are segregated into social security accounts with restrictions on eligible transactions.

5. The method of claim 1, where the endowment of portfolio owners with Stock Market Units includes issuance of script.

6. The method of claim 1, where the transaction processing phase includes transactions submitted by means of the internet.

7. The method of claim 1, where the endowment of portfolio owners with state owned assets is to provide an equitable distribution of the state owned assets.

8. The method of claim 1, where the endowment of portfolio owners with state owned assets is to transfer a less risky composite portfolio.

9. The method of claim 1, where the endowment of portfolio owners with state owned assets is to avoid uncertainty in underwriting valuations.

10. The method of claim 1, where the endowment of portfolio owners with state owned assets is to reduce a burden on the government budget arising from subsidies to state enterprises and from social welfare payments.

11. The method of claim 1, where the disposition phase is to promote widespread accounts with private financial institutions.

12. The method of claim 1, where the endowment of portfolio owners with state owned assets is to provide microeconomic stimulus by providing capital for small private enterprises and macroeconomic stimulus by increasing household wealth and income.

13. The method of claim 1, adapted to promote a reliable market in delegated investment authority,
  by including in said transactions:
    orders to delegate investment authority to qualified delegatees, and
    offers by qualified delegatees to accept investment authority, and
  by including in the processing of said transactions:
    integrating the calculation of market-clearing prices with clearing the submarket in delegated investment authority.

14. The method of claim 13, where the integrated submarket in delegated investment authority is to prevent fraud.

15. The method of claim 1, where the state owned assets are natural resource rights.

16. The method of 15, where the natural resource rights are rights to mineral deposits.

17. The method of 15, where the natural resource rights are rights to electromagnetic spectrum bandwidth.

18. The method of claim 1, where the state owned assets are pollution rights.

19. The method of claim 18, where the pollution rights are sulfur dioxide emission permits.

20. The method of claim 18, where the pollution rights are greenhouse gas emission permits.

* * * * *